(12) United States Patent
Painter

(10) Patent No.: US 11,354,939 B2
(45) Date of Patent: *Jun. 7, 2022

(54) TRACKING OF HANDHELD SPORTING IMPLEMENTS USING COMPUTER VISION

(71) Applicant: SportsMEDIA Technology Corporation, Durham, NC (US)

(72) Inventor: James G. Painter, Palo Alto, CA (US)

(73) Assignee: SPORTSMEDIA TECHNOLOGY CORPORATION, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,622

(22) Filed: Sep. 11, 2020

(65) Prior Publication Data

US 2021/0012098 A1    Jan. 14, 2021

Related U.S. Application Data

(63) Continuation of application No. 16/682,556, filed on Nov. 13, 2019, now Pat. No. 10,776,616, which is a
(Continued)

(51) Int. Cl.
*G06K 9/00*          (2022.01)
*G06V 40/20*        (2022.01)
(Continued)

(52) U.S. Cl.
CPC .............. *G06V 40/25* (2022.01); *G06T 7/215* (2017.01); *G06T 7/254* (2017.01); *G06T 7/292* (2017.01);
(Continued)

(58) Field of Classification Search
CPC .. G06K 9/00348; G06K 9/00664; G06K 9/46; G06K 2009/4666; G06T 7/215;
(Continued)

(56) References Cited

U.S. PATENT DOCUMENTS 7,264,554 B2   9/2007  Bentley
7,283,647 B2  10/2007  McNitt
(Continued)

OTHER PUBLICATIONS

"Robust Golf Club Tracking," Computer Vision Laboratory CVLAB, downloaded from http://cvlab.epfl.ch/research/completed/golf on Mar. 7, 2016, 3 pages.
(Continued)

*Primary Examiner* — Charlotte M Baker
(74) *Attorney, Agent, or Firm* — Neo IP

(57) ABSTRACT

A path and/or orientation of object approaching an athlete is tracked using two or more cameras. At least two sets of images of the object are obtained using at least two different cameras having different positions. Motion regions within images are identified, and candidate locations in 2D space of the object are identified within the motion region(s). Based thereon, a probable location in 3D space of the identifiable portion is identified, for each of a plurality of instants during which the object was approaching. A piecewise 3D trajectory of at least the identifiable portion of the object is approximated from the probable locations in 3D space of the object for multiple instants during which the object was approaching the athlete. A graphical representation of the 3D trajectory of the object is incorporated into at least one of the sets of images.

17 Claims, 13 Drawing Sheets

Related U.S. Application Data continuation of application No. 16/503,046, filed on Jul. 3, 2019, now Pat. No. 10,482,319, which is a continuation of application No. 16/165,432, filed on Oct. 19, 2018, now Pat. No. 10,346,679, which is a continuation of application No. 15/845,523, filed on Dec. 18, 2017, now Pat. No. 10,115,007, which is a continuation of application No. 15/072,176, filed on Mar. 16, 2016, now Pat. No. 9,846,805.

(51) Int. Cl.

| | |
|---|---|
| *H04N 5/247* | (2006.01) |
| *G06T 7/254* | (2017.01) |
| *G06V 10/40* | (2022.01) |
| *G06V 20/10* | (2022.01) |
| *G06T 7/215* | (2017.01) |
| *G06T 7/292* | (2017.01) |
| *H04N 5/262* | (2006.01) |
| *G06V 10/46* | (2022.01) |

(52) U.S. Cl.
CPC ............... *G06V 10/40* (2022.01); *G06V 20/10* (2022.01); *H04N 5/247* (2013.01); *G06T 2207/10021* (2013.01); *G06T 2207/30221* (2013.01); *G06T 2207/30241* (2013.01); *G06V 10/467* (2022.01); *H04N 5/2625* (2013.01)

(58) Field of Classification Search
CPC ...................... G06T 7/254; G06T 7/292; G06T 2207/10021; G06T 2207/30221; G06T 2207/30241; H04N 5/247; H04N 5/2625; G06V 40/25; G06V 10/40; G06V 20/10; G06V 10/467
USPC .......................................... 382/103; 702/145
See application file for complete search history.

(56) References Cited

U.S. PATENT DOCUMENTS

| | | |
|---|---|---|
| 8,335,345 B2 | 12/2012 | White et al. |
| 8,628,453 B2 | 1/2014 | Balakrishnan et al. |
| 8,884,741 B2 | 11/2014 | Cavallaro et al. |
| 9,370,704 B2 | 6/2016 | Marty |
| 9,390,501 B2 | 7/2016 | Marty et al. |
| 2009/0074246 A1* | 3/2009 | Distante ................. G06V 10/24 706/46 |
| 2015/0012240 A1 | 1/2015 | Sato |
| 2019/0050636 A1 | 2/2019 | Painter |
| 2019/0325206 A1 | 10/2019 | Painter |
| 2020/0082163 A1 | 3/2020 | Painter |

OTHER PUBLICATIONS

Chugh, Ravi et al., "Golf Club Head Tracking," [http://cseweb.ucsd.edu/~rchugh/swingimp/], Slides, Mar. 12, 2008, 16 pages.

Chugh, Ravi, "Converting 2D golf swing sequences into 3D models," SwingImp, [http://swingimp.blogspot.com/], Mar. 12, 2008, 6 pages.

Chugh, Ravi, "Golf Club Tracking," [http://cseweb.ucsd.edu/~rchugh/swingimp/], Mar. 12, 2008, 1 page.

Chugh, Ravi, et al., "CSE 190a Project Report: Golf Club Head Tracking," Mar. 16, 2008, 7 pages.

Gehrig, Nicolas, et al., "Visual Golf Club Tracking for Enhanced Swing Analysis," Computer Vision Laboratory, Jul. 10, 2003, 10 pages.

Lepetit, Vincent, et al., "Robust Data Association," Computer Vision Laboratory, Jan. 2003, 8 pages.

Lepetit, Vincent, et al., "Robust Visual Golf Club Tracking," CVlab—Ecole Polytechnique Federale De Lausanne, downloaded from http://cvlab.epfl.ch on Feb. 25, 2016, 26 pages.

* cited by examiner

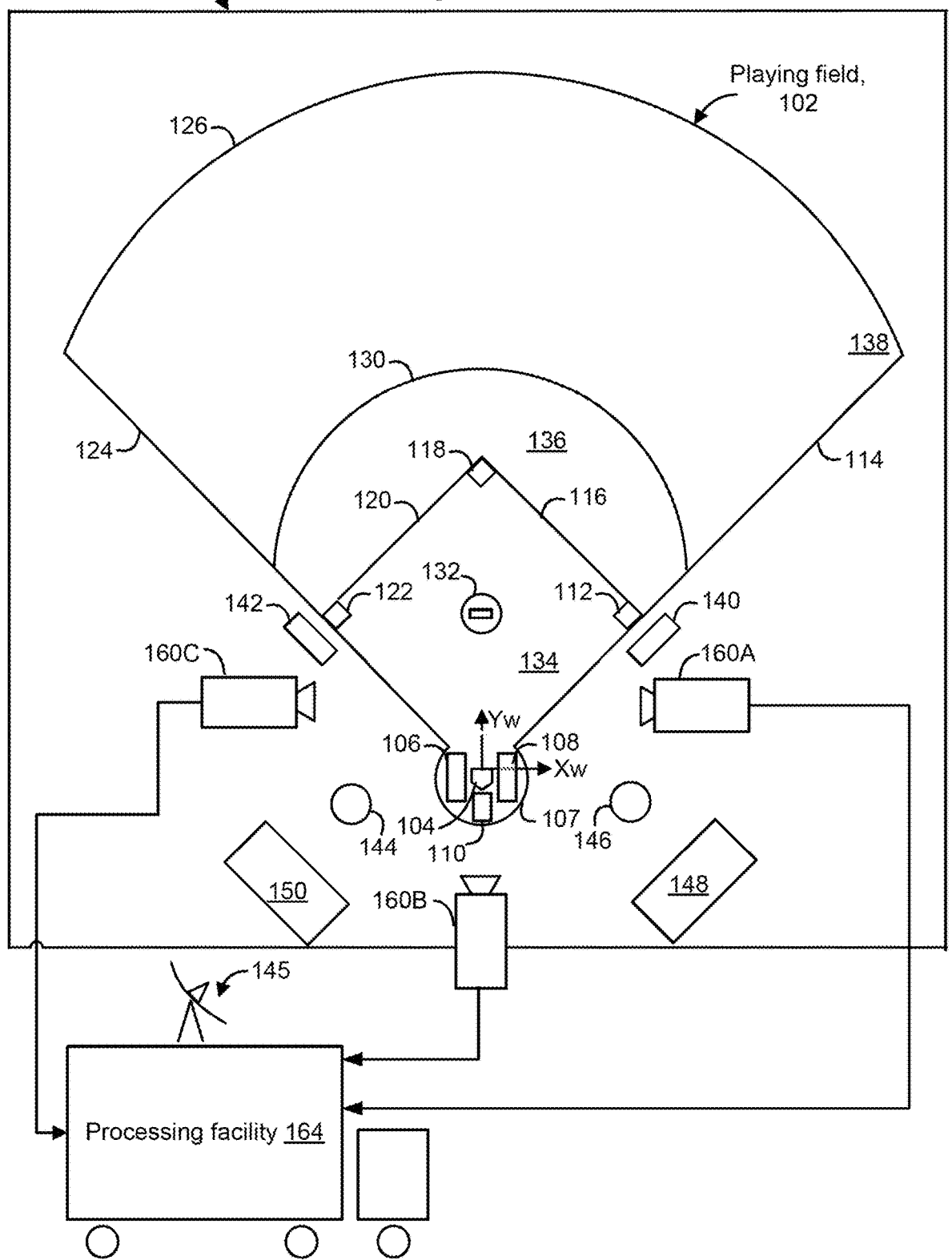

TRACKING OF HANDHELD SPORTING IMPLEMENTS USING COMPUTER VISION

CROSS REFERENCE TO RELATED APPLICATIONS

This application is related to and claims priority from the following US patent applications. This application is a continuation of U.S. patent application Ser. No. 16/682,556 filed Nov. 13, 2019, which is a continuation of U.S. patent application Ser. No. 16/503,046 filed Jul. 3, 2019, which is a continuation of U.S. patent application Ser. No. 16/165,432 filed Oct. 19, 2018, which is a continuation of U.S. patent application Ser. No. 15/845,523 filed Dec. 18, 2017, now U.S. Pat. No. 10,115,007, which is a continuation of U.S. patent application Ser. No. 15/072,176 filed Mar. 16, 2016, now U.S. Pat. No. 9,846,805, each of which is incorporated herein by reference in their entirety.

BACKGROUND OF THE INVENTION

1. Field of the Invention

The present invention relates to tracking of handheld sporting implements using computer vision.

2. Description of the Prior Art

Many sports involve an athlete swinging a handheld sporting implement in an attempt to strike another object. Such a handheld sporting implement is often a long, stick-like object, such as a baseball bat, a cricket bat, a golf club or a hockey stick, which is swung in an attempt to hit a ball or a puck. The technique and precision with which the athlete performs this swinging motion directly affects the athlete's performance, as well as the performance of an entire team of athletes, in the case of team sports. The present boom in sports analytics provides a strong demand for scrutinizing an athlete's swinging technique in order to take the athlete's performance to increasingly higher-skilled levels.

SUMMARY OF THE INVENTION

The present invention relates to systems and methods for tracking an object approaching an athlete.

Embodiments described herein can be used for tracking a path and/or orientation of at least a portion of a handheld sporting implement that is swung by an athlete. The handheld sporting implement, which can be, e.g., a baseball bat, a cricket bat, a golf club, or a hockey stick, may have a shaft extending between two ends, such as a head and a knob. A method according to an embodiment of the present technology includes receiving two or more different sets of video images of a handheld sporting implement being swung by an athlete, wherein at least two of the different sets of video images are captured using at least two different cameras having different positions. The method also includes identifying one or more motion regions within each of a plurality of the video images in each of at least two of the different sets of video images. One or more candidate locations in two-dimensional (2D) space of an identifiable portion (e.g., the head) of the handheld sporting implement is/are identified within the identified motion region(s) of the video image, for at least a subset of the video images included in at least two of the different sets of video images. Based on the candidate locations in 2D space of the identifiable portion (e.g., the head) of the handheld sporting implement, a probable location in three-dimensional (3D) space of the identifiable portion (e.g., the head) of the handheld sporting implement is identified, for each of a plurality of instants during which the handheld sporting implement was swung by the athlete. Additionally, a piecewise 3D trajectory of at least the identifiable portion (e.g., the head) of the handheld sporting implement is approximated from the probable locations in 3D space of the identifiable portion (e.g., the head) of the handheld sporting implement identified for the plurality of instants during which the handheld sporting implement was swung by the athlete. Such embodiments can be extended to track the path of more than just the head of the handheld sporting implement during a swing, and more specifically, can be extended to track the path of the entire shaft of the swung handheld sporting implement.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 1A depicts a baseball park and equipment for obtaining video images of an athlete swinging a baseball bat type of handheld sporting implement.

DETAILED DESCRIPTION

Figure 1B:
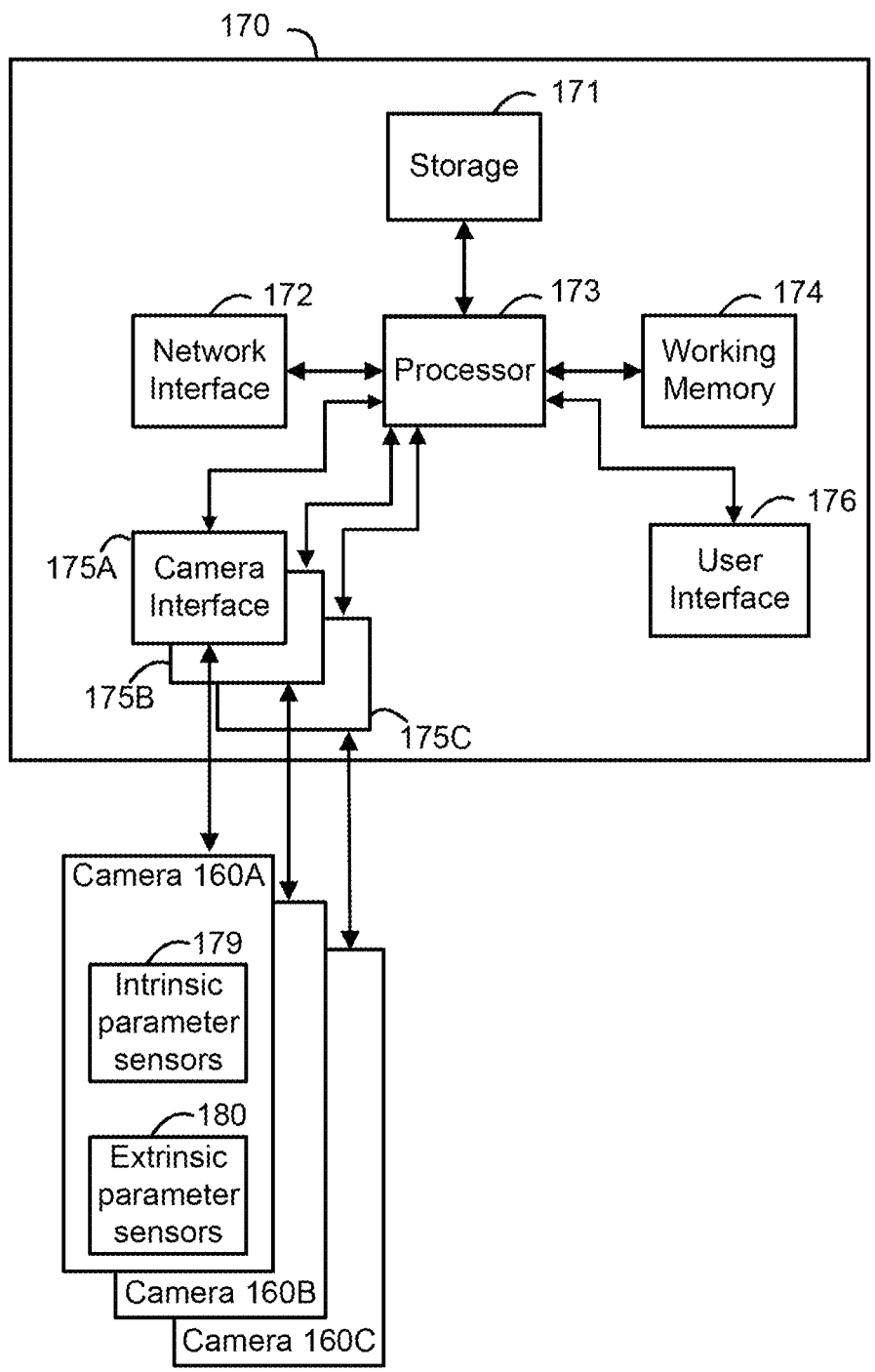
FIG. 1B depicts further details of the processing facility and cameras of FIG. 1A, and more generally, depicts a computer system for tracking a path of a handheld sporting implement that is swung by an athlete.

The present invention is generally directed to systems and methods for tracking objects approaching athletes.

None of the prior art discloses a system that uses two or more cameras to approximate the trajectory of an object approaching a player and incorporate a graphical representation of the 3D trajectory of the object into video from one of the cameras.

Referring now to the drawings in general, the illustrations are for the purpose of describing one or more preferred embodiments of the invention and are not intended to limit the invention thereto.

Embodiments of the present technology can be used to track a path and/or orientation of at least a portion of a handheld sporting implement that is swung by an athlete. Such embodiments can provide a fully- or semi-automated computation of a three-dimensional path of an athlete's swing. This trajectory of motion can be used to aid an athlete in a variety of ways. For example, a swing can be correlated with the outcome of the swing, enabling an athlete or other person (or a system) to compare desired outcomes with the swings that produced them, and ultimately, to fine-tune the athlete's swing to produce those desired outcomes. For more specific examples, an athlete may attempt to adjust the arc of his or her swing in order to match the one which produced a hole-in-one in golf, a 100 mile per hour (M.P.H.) slap shot in hockey, or a home run in baseball.

Professional sports have become a large business in the United States, putting increasing pressure on sports team owners to make wise "investments" in the players they choose for their teams. The analysis of an athlete's swing can aid these executives, as well as coaches and trainers, in the evaluation of prospective athletes, providing informative, objective measures of the athlete's talent.

Further, success of both an individual athlete and a team of athletes depends largely on the health of those involved. A single injury can end an athlete's season or career, can be fatal to a team's performance, and can potentially lead to financial ruin for the sports club or individual involved. Embodiments of the present technology enable the evaluation of subtleties in an athlete's swinging motion that may cause an injury, and in turn, can be used to avoid such motions to keep an athlete injury-free.

For certain embodiments, it is assumed herein that the handheld sporting implement that is swung by an athlete includes a shaft extending between a head and a knob. For example, the handheld sporting implement can be a baseball bat or a cricket bat that includes a bat head at one end of a bat shaft and a bat knob at the other end of the shaft close to where an athlete grips the bat. For another example, the handheld sporting implement can be a golf club that includes a club head at one end of a shaft and a knob at the end of the shaft close to where an athlete grips the golf club. For still another example, the handheld sporting implement can be a hockey stick that includes a head that is typically referred to as a hockey blade at one end of the shaft and a knob at the other end of the shaft close to where an athlete grips the hockey stick. The head of the handheld sporting implement, as the term is used herein, refers to the distal end of the shaft of the handheld sporting implement that is far from where an athlete holds the shaft. The knob of the handheld sporting implement, as the term is used herein, refers to the proximal end of the shaft of the handheld sporting implement that is close to where an athlete grips or holds the shaft. Depending upon the specific handheld sporting implement, the knob may or may not be wider than the portion of the shaft that is held by an athlete. For example, while the knob of a baseball bat is typically wider than the adjacent portion of the bat that is gripped by an athlete, that is not always the case with a cricket bat or a golf club.

In the description that follows, like numerals or reference designators will be used to refer to like parts, steps or elements throughout. In addition, the first digit of a three digit reference number, or the first two digits of a four digit reference number, identifies the drawing in which the reference number first appears. Further, it is noted that the terms "identifying" and "determining" are often used interchangeably herein.

Figure 1C:
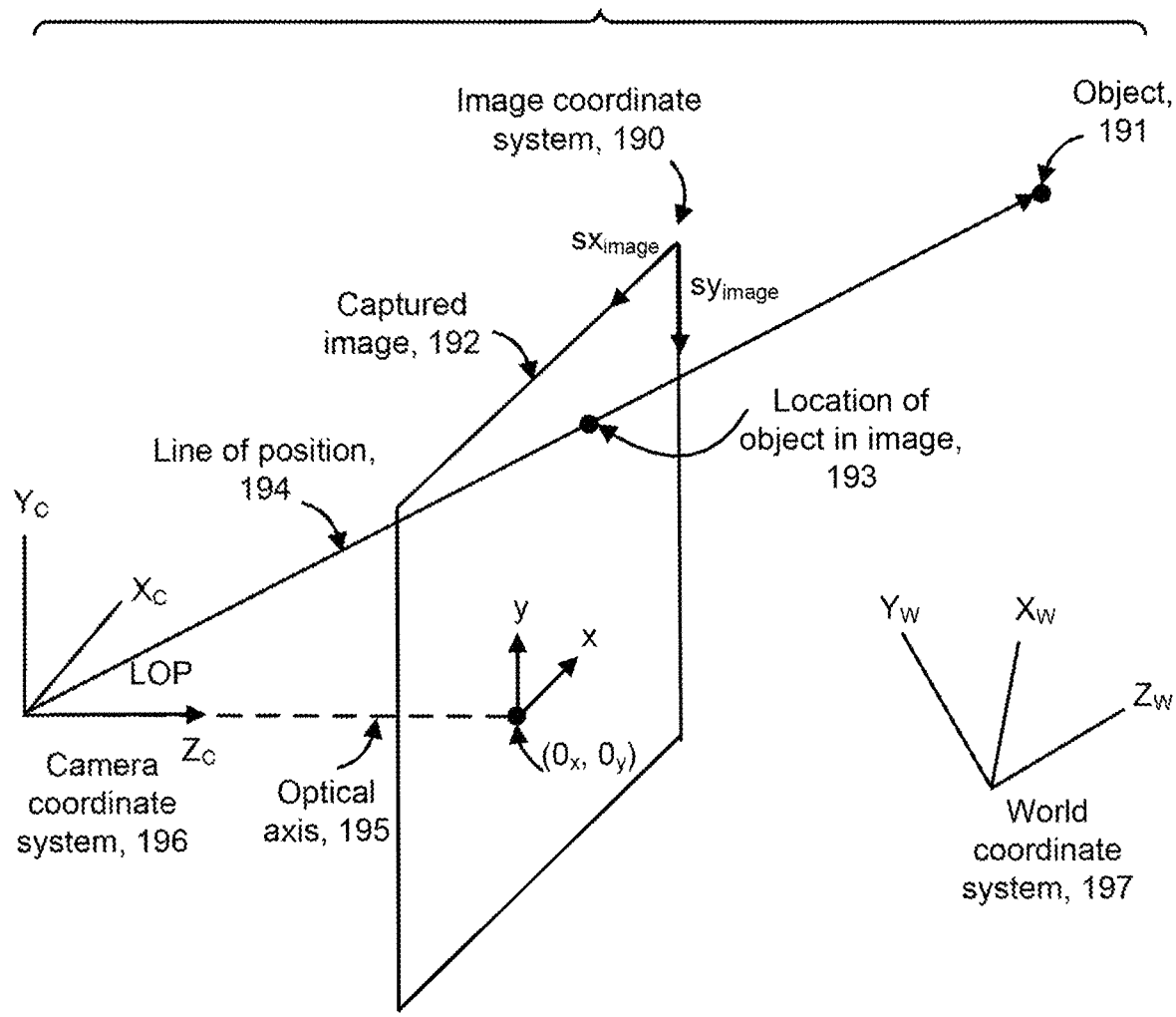
FIG. 1C depicts a relationship between camera, image and world coordinate systems, for use by the processing facility of FIG. 1A for, among other things, tracking a path of a handheld sporting implement that is swung by an athlete.

FIG. 1A-1C will initially be used to describe equipment that can be used to implement the embodiments described herein, specifically where the handheld sporting implement is a baseball bat. Nevertheless, it should be appreciated that embodiments of the present technology can alternatively be used to track a path and/or orientation of other types of handheld sporting implements that are swung by an athlete, including, but not limited to, a cricket bat, a golf club, or a hockey stick.

FIG. 1A depicts a baseball park 100 and equipment for obtaining video images, which can also be referred to herein as frames of video, video frames, or simply as frames or images. The baseball park 100 can be a baseball stadium or a smaller facility, and includes a playing field 102. The playing field 102 can be arranged according to standard rules of baseball, e.g., as described in the "Official Baseball Rules" of Major League Baseball (MLB). A baseball game can be a game which is played according to these rules or similar rules. The fair territory boundaries of the playing field are the foul lines 114 and 124, the outfield boundary 126 which may be a fence or wall, and the semicircle 107 around home plate 104. Line 130 is the boundary between the outfield 138 and the infield. The infield includes a square/diamond region (including two sides 120 and 116) between the four bases 104, 112, 118 and 122. The infield also includes a curved region 136 which is between the regions 134 and 138. Also provided are: a left-side batter's box 106, a right-side batter's box 108, a catcher's box 110, a first base coach's box 140, a third base coach's box 142, a pitcher's mound 132, on-deck circles 144 and 146, and dugouts 150 and 148.

A number of video cameras obtain video images of the game as it transpires in the baseball park 100. The video cameras can be, e.g., cameras dedicated for use in tracking, or television video cameras that are also used to televise and/or record a game, or a combination thereof. Any one of the cameras can have a fixed location or can be movable, and any one of the cameras can have a fixed or variable pan-tilt-zoom (PTZ). For example, in FIG. 1A three cameras 160A, 160B and 160C are depicted outside the fair territory of the playing field 102 (and thus, in foul territory), with the camera 160A generally facing the base path between home plate 104 and first base 112, the camera 160B behind and generally facing home plate 104, and the camera 160C generally facing the base path between home plate 104 and third base 122. The video images captured by each of the cameras 160A, 160B and 160C preferably include the full stance or pose of the athlete (e.g., a baseball player) and the cameras collectively preferably capture the full range of swinging motion, but that need not be the case. Where each of the cameras 160A, 160B and 160C is located at a different position than one another, the images captured by the different cameras will differ from one another, despite including common objects within their images. The video images captured by of each of the cameras 160A, 160B and 160C may also include the pitcher's mound 132, so that the cameras are capable of being used to capture video images of a baseball as it travels from the pitcher's mound 132 to home plate 104. More generally, if the object being swung at is moving, the video images captured by each of the cameras 160A, 160B and 160C may preferably include the object (e.g., ball or puck) to be struck by the handheld sporting implement (e.g., baseball bat or hockey stick) as the object travels toward the swinging handheld sporting implement, so that the same images, if desired, can also be used to track the object at which the handheld sporting implement is being swung. The cameras 160A, 160B and 160C can be referred to collectively as cameras 160, or individual as a camera 160. In certain embodiments, one or more of the cameras 160 may be located at a different height than one or more of the other camera(s) 160. One or more of the cameras 160 may have different lenses, zoom, etc., than the other cameras. Further, various different types of cameras 160 may be used in various different combinations. While three cameras 160 are depicted, more or fewer than three cameras 160 can alternatively be used, so long as there are at least two cameras 160. In one approach, two to six cameras 160, capturing color or monochrome images, can be used. A processing facility 164 receives and processes frames of video images from the cameras 160. In one approach, the processing facility 164 is a mobile facility such as a truck which is parked outside the baseball park. The processing facility 164 can subsequently transmit the captured images and other information via an antenna 145, to another location such as a television broadcast facility. In another approach, the processing facility can be remote from the baseball park 100. Or, the processing facility can be a permanent facility, neither mobile nor remote, such as one which is inside the baseball park. The cameras 160 can provide captured images or frames to the processing facility via wired or wireless communication links, or a combination thereof, which may or may not include the Internet.

In accordance with certain embodiments, the cameras 160 are all synchronized so that each of the cameras 160 obtains video images of an athlete swinging a baseball bat, with at least two of the cameras 160 being at different positions, at common points in time (i.e., at common instants that the handheld sporting implement is being swung). This way triangulation and/or other techniques can be used to determine the location of the head, knob and/or shaft of the baseball bat in three-dimensional (3D) space from the two-dimensional (2D) images of the baseball bat captured at the same times by the different cameras 160, as will be appreciated from the description below. In alternative embodiments, the various cameras 160 may be unsynchronized relative to one another.

Additional cameras 160 can be used as well to increase the accuracy and/or robustness of the tracking. The cameras can be, e.g., special purpose machine vision cameras. Alternatively, or additionally, television broadcast cameras can be used. Such broadcast cameras typically capture thirty frames or sixty fields per second, but may capture frames and/or fields at other rates as well (for example progressive cameras typically capture sixty frames per second, and super slow motion cameras capture much higher frame rates). Other cameras that capture multiple frames of video images per second can alternatively be used. The locations of objects in the baseball park, including participants, a baseball bat, and a baseball, can be described in terms of a world coordinate system, also known as a free space coordinate system, which is fixed relative to the earth or other environment of interest, in one approach. The world coordinate system includes orthogonal directions represented by a Yw axis, an Xw axis, and a Zw axis (not shown) which extends out of the page in FIG. 1A. An origin of the world coordinate system is chosen to be at the tip of home plate 104, as an example. World coordinate space is an exemplary type of 3D space.

Each camera 160 can be provided with sensors which detect intrinsic and extrinsic parameters of the camera when these parameters are variable. Intrinsic parameters, such as focal length, lens distortion and zoom setting represent characteristics of the camera design and settings, and do not depend on the position and orientation of the camera in space. Extrinsic parameters, such as tilt or pan, depend on the position and orientation of the camera in space. Such sensors can be provided using techniques known to those skilled in the art. For example, pan and tilt sensors can be attached to a tripod head on which the camera is mounted. See, e.g., U.S. Pat. No. 5,912,700, issued Jun. 15, 1999, and incorporated herein by reference. The sensors can be used to determine where the camera is pointing and what it can see. The sensors can be used to determine where the camera is pointing and what it can see. Or, the cameras can be stationary and fixed so that they do not pan, tilt or zoom dynamically, in which case mathematical methods can be used to detect the extrinsic and intrinsic camera parameters. In certain embodiments, broadcast cameras with a pan-tilt-zoom (PTZ) capability could be used for all of the tracking, part of the tracking, or in conjunction with stationary and fixed cameras to assist with the tracking.

It is possible to determine camera extrinsic and intrinsic parameters without sensors, e.g., as described in Tsai's method. See, e.g., Tsai, Roger Y. (1986) "An Efficient and Accurate Camera Calibration Technique for 3D Machine Vision," Proc. of IEEE Conf. on Computer Vision and Pattern Recognition, Miami Beach, Fla., 1986, pp. 364-374. For example, one approach to determine the intrinsic and extrinsic parameters of a camera involves placing physical markers, known as fiducials, in various measured or known locations in the event facility such that the fiducials can be seen clearly enough to be identified from the camera images, and at least one fiducial will always be visible to the camera while the camera is pointed at the event facility. A computer using optical recognition technology can find the fiducial in the video frame and, based on the mark's size, shape, color and/or position in the video frame, determine the camera parameters. Another approach to determining intrinsic and extrinsic parameters of a camera involves placing fiducials in various measured or known locations in the event facility such that each fiducial looks different, but the fiducials may be removed after camera parameters have been determined. A computer implementing a camera parameter estimation algorithm based on manual user interaction rather than, or in addition to, image recognition can determine camera parameters.

FIG. 1B depicts further details of the processing facility 164 and cameras 160 of FIG. 1A. The computer system 170 is a simplified representation of a system which might be used at the processing facility 164 (FIG. 1A), for example. The computer system 170 includes a storage device 171 such as a hard disk or portable media, a network interface 172 for communicating with other computer systems, one or more processors 173 for executing software instructions, a working memory 174 such as RAM for storing the software instructions after they are loaded from the storage device 171, for example, camera interfaces 175A, 175B and 175C, and a user interface display 176. The camera interfaces 175A, 175B and 175C can be referred to collectively as camera interfaces 175, or individually as a camera interface 175. The storage device 171 may be considered to be a processor readable storage device having processor readable code embodied thereon for programming the processor 173 to perform methods for providing the functionality discussed herein. The user interface display 176 can provide information to a human operator based on the data received from the cameras 160 via the camera interfaces 175. The user interface display 176 can use any known display scheme, whether graphical, tabular or the like. In addition to an on-screen display, an output such as a hard copy from a printer can be provided to report results. Results can also be reported by storing data at the storage device 171 or other memory, e.g., for later use. Results could also be sent via the network interface 172 and the Internet or other wide area network, to another, central storage location. In certain embodiments, the results can include a digital record of a baseball game or portions thereof.

An example camera 160A includes intrinsic parameter sensors 179 and extrinsic parameter sensors 180. The intrinsic parameter sensors 179 can identify a zoom setting, whether an extender is used and so forth. The extrinsic parameter sensors 180 can identify an orientation of the camera 160A, such as a pan and tilt of the camera. Note that sensors are not needed when the parameter of concern is not changing. The camera 160A communicates image data, whether analog or digital, in addition to data from the intrinsic parameter sensors 179 and the extrinsic parameter sensors 180 to the computer system 170 via the camera interface 175. The image data can include video images captured by the camera 160A. Similarly, the other cameras 160B and 160C, which can each include intrinsic parameter sensors and extrinsic parameter sensors, can communicate image data to the camera interfaces 175B and 175C. Data from more or fewer than three cameras 160 can be received as well.

Further, the functionality described herein may be implemented using one or more processor readable storage devices (e.g., 171 and 174) having processor readable code embodied thereon for programming one or more processors to perform the processes described herein. The processor readable storage devices can include non-transitory, tangible computer readable media such as volatile and nonvolatile media, removable and non-removable media. Computer readable media includes volatile and nonvolatile, removable and non-removable media implemented in any method or technology for storage of information such as computer readable instructions, data structures, program modules or other data. Computer readable media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other non-transitory, tangible medium which can be used to store the desired information and which can be accessed by a computer.

FIG. 1C depicts a relationship between camera, image and world coordinate systems, for use by the processing facility of FIG. 1A for tracking a path of a handheld sporting implement that is swung by an athlete. A camera coordinate system 196, which includes orthogonal axes $X_C$, $Y_C$ and $Z_C$ in three dimensions, is fixed relative to the camera. The origin of the coordinate system may be at the center of projection of the lens, in one possible approach, modeling the camera as a pinhole camera. An image coordinate system 190, also referred to as pixel space or image space, includes orthogonal axes X and Y in two-dimensions, and is fixed relative to a captured image 192. A world coordinate system 197, also referred to as world space, which includes orthogonal axes $X_W$, $Y_W$ and $Z_W$, is fixed relative to, e.g., the earth, a baseball park or other event site, or other reference point or location. Image space is an example of a 2D space, whereas world space is an example of a 3D space. Generally, it is desirable to describe the position and/or path of the tracked object 191 (e.g., a tracked baseball) in the world coordinate system 197, which is a 3D coordinate system, as this is typically the coordinate system in which its motion is most relevant to the user, and allows easier integration of the information from several cameras. The line of position 194 is an imaginary line which extends from the origin of the camera coordinate system 196, which as noted above can be the center of projection of the lens, through a pixel in the image 192, intersecting the pixel at a point 193, and through the tracked object 191. Each pixel in the image 192 corresponds to a different line of position (LOP). Point 193 in the captured image 192 represents the location of an object 191 (e.g., a head of a baseball bat) in the image. The location of the object in the image 192 can be represented by coordinates (sx, sy) in a coordinate system which has its origin at a corner of the image, in one approach. The coordinates may identify the center of the object. When the object is a tracked human participant, characteristics such as the outline of the participant can be detected.

Further, the line of position can be represented by a 3-D vector (LOP) which has unity magnitude, in one approach. The vector can be defined by two points along the LOP. Alternatively, the vector can be defined by one point along the LOP, if the center of projection of the lens is known. The vector can be represented in the world coordinate system 197 using an appropriate transformation from the image coordinate system. The $Z_C$ axis of the camera coordinate system, which is the optical axis 195 of the camera, intersects the captured image at a point represented by coordinates $(0_x, 0_y)$. A two-dimensional coordinate system extending from $(0_x, 0_y)$ can also be defined.

The camera registration process involves obtaining one or more transformation matrices which provide a conversion between the image coordinate system 190 and the world coordinate system 197. Further information can be found in E. Trucco and A. Verri, "Introductory techniques for 3-D computer vision," chapter 6, Prentice Hall, 1998, U.S. Pat. No. 5,912,700, issued Jun. 15, 1999, and U.S. Pat. No. 6,133,946, issued Oct. 17, 2000, each of which is incorporated herein by reference.

In accordance with certain embodiments of the present technology, two or more cameras 160 are used to capture video images of an athlete applying a swinging motion to a bat, and more generally, to a handheld sporting implement. Using computer vision techniques, the far end of the handheld sporting implement, otherwise referred to as the head, is identified in many video images (also referred to as video frames) containing the moving handheld sporting implement and the moving athlete holding the handheld sporting implement. Using multiple views of this movement, a three-dimensional position of the head can be identified in many, but perhaps not all, instants corresponding to the time each video image was captured. Using these measurements of 3D positions, a smoothly-varying representation of the motion of the swinging implement is computed over the course of the movement. Such embodiments will initially be described with reference to the high level flow diagram of FIG. 2. More specifically, FIG. 2 will be used to describe certain methods for tracking a path of a handheld sporting implement that is swung by an athlete, wherein the handheld sporting implement has a shaft extending between a head and a knob.

Figure 2:
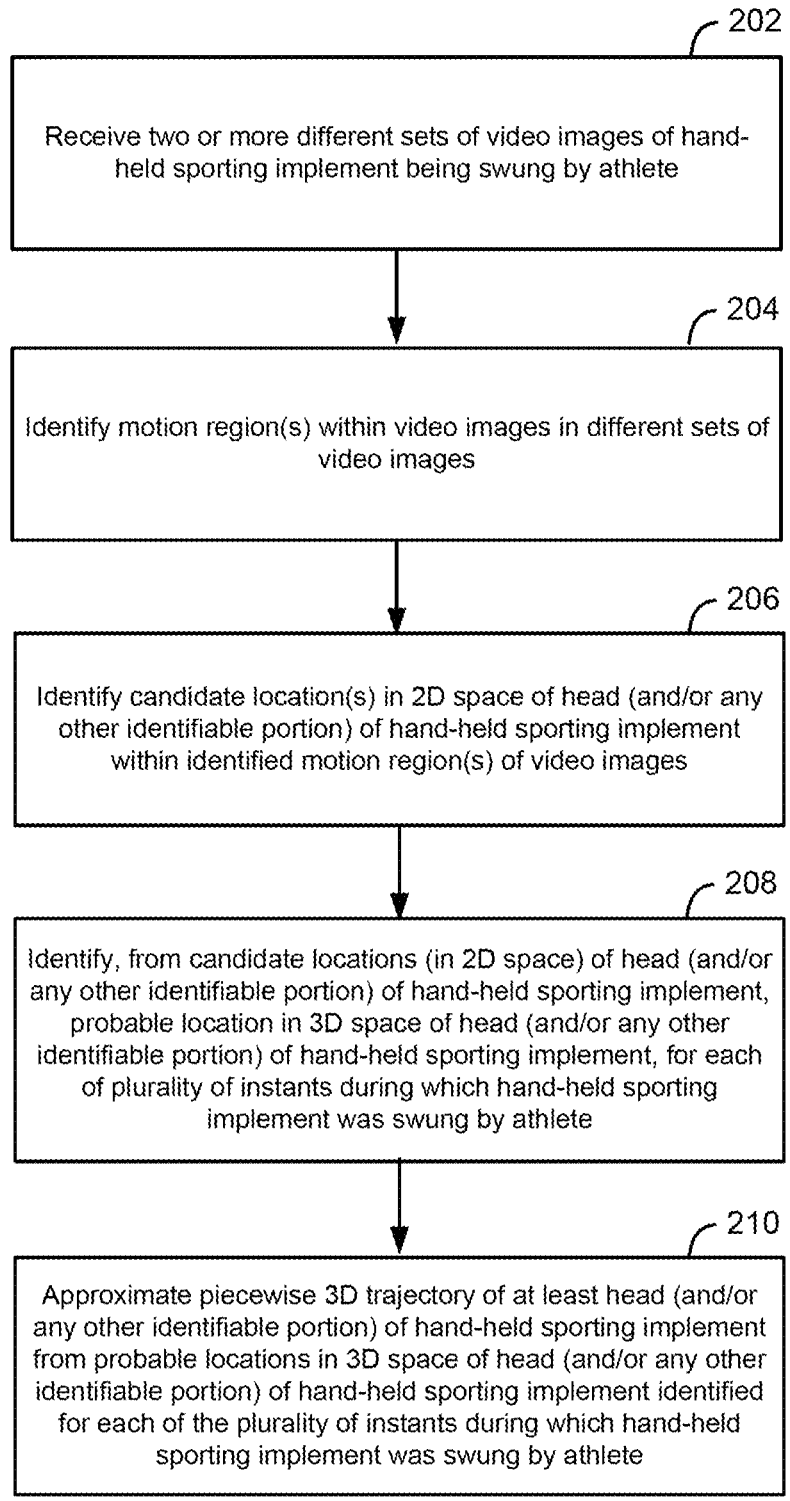
FIG. 2 is a high level flow diagram that is used to describe certain methods for tracking a path and/or orientation of at least a portion of a handheld sporting implement that is swung by an athlete.

Referring to FIG. 2, step 202 involves receiving two or more different sets of video images of a handheld sporting implement being swung by an athlete, wherein each of the different sets of video images is captured using a different camera, and wherein at least two of the different cameras have a different position. For example, referring back to FIG. 1A, step 202 can include receiving a first set of video images of an athlete swinging a bat captured using the camera 160A, receiving a second set of video images of the athlete swinging the bat captured using the camera 160B, and receiving a third sets of video images of the athlete swinging the bat captured using the camera 160C. In this example, the location of the camera 160A is in foul territory between home plate and first base, the location of the camera 160B is in foul territory behind home plate, and the location of the camera 160C is foul territory between home plate and third base. For the purpose of this description, it can be assumed that step 202 involves receiving three sets of video images of an athlete swinging a bat, from the cameras 160A, 160B and 160C, wherein each set of images includes thirty video images. As noted above, the cameras 160A, 160B and 160C can collectively be referred to as the cameras 160, or individually as a camera 160.

Figure 3C:
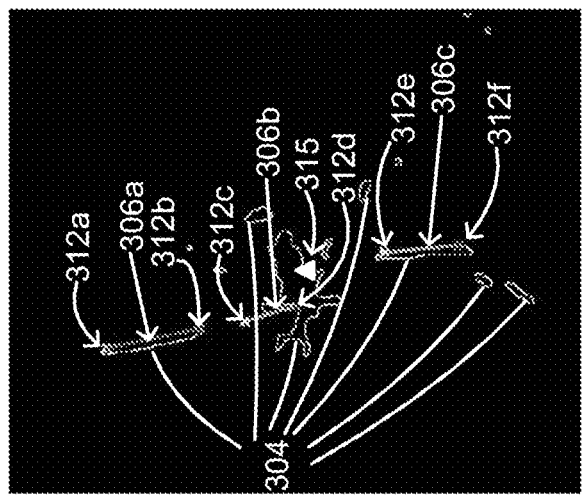
FIG. 3C illustrates outlines of the motion regions shown in FIG. 3B, as well as candidate shafts of the handheld sporting implement identified within the motion regions, and candidate heads of the handheld sporting implement.
Figure 3B:
FIG. 3B illustrates motion regions identified by comparing the video image in FIG. 3A to a preceding video image and/or a following video image in a sequence of the video images captured by the same one of the cameras in FIG. 1A.
Figure 3A:
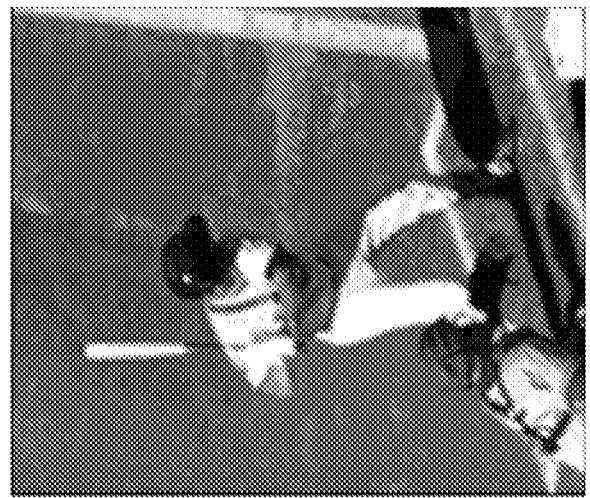
FIG. 3A illustrates an exemplary video image (also known as a video frame) obtained by one of the cameras shown in FIG. 1A.

Referring again to FIG. 2, step 204 involves identifying one or more motion regions within each of a plurality of the video images in each of the different sets of video images. For the purpose of this description, it will be assumed that step 204 involves identifying one or more motion regions within each of the thirty video images in each of the three sets of video images, and thus, involves identifying motion region(s) within each of the ninety video images. FIG. 3A illustrates an exemplary video image (also known as a video frame) obtained by the camera 160A in FIG. 1A. FIG. 3B illustrates motion regions identified by comparing the video image in FIG. 3A to a preceding video image and/or a following video image in a sequence of the video images captured by the camera 160A. As can be appreciated from FIGS. 3A and 3B, the motion regions include the bat (and more generally, the handheld sporting implement) that is being swung, and the athlete's arms that are swinging the bat, and portions of the athletes legs that move when the athlete swings the bat. FIG. 3C, shown to the right of FIG. 3B, will be discussed below when describing step 206 in FIGS. 2 and 5. Additional details of step 204, according to a specific embodiment of the present technology, are described below with reference to FIG. 4.

Referring again to FIG. 2, step 206 involves, for at least a subset (i.e., all or some) of the video images included in each of the different sets of video images, identifying one or more candidate locations in 2D space of the head of the handheld sporting implement within the identified motion region(s) of the video image. Referring to FIG. 3C, the points labeled 312a, 312b, 312c, 312d, 312e and 312f are exemplary candidate locations in 2D space of the head of the bat within the identified motion region(s) shown in FIG. 3B of the video image shown in FIG. 3A. Additional details of step 206, according to a specific embodiment of the present technology, are described below with reference to FIG. 5. Each of the candidate locations in 2D space of the head of the handheld sporting implement can be specified by the pixel coordinates (e.g., sx, sy) for each image in a set of images.

Referring again to FIG. 2, step 208 involves identifying (from the candidate locations in 2D space of the head of the handheld sporting implement) a probable location in three-dimensional (3D) space of an identifiable portion (e.g., the head) of the handheld sporting implement, for each of a plurality of instants during which the handheld sporting implement was swung by the athlete. The plurality of instants can be all of the times that video images were captured using two or more of the cameras 160A, 160B and 160C, or just some of those times. Further, it is noted that for some of the instants, the bat head (or other identifiable portion of the handheld sporting implement) may be captured by fewer than all of the cameras 160A, 160B and 160C, e.g., due to the player or something else obstructing the view of the bat head from certain cameras during certain instants, or for other reasons. Additional details of step 208, according to a specific embodiment of the present technology, are described below with reference to FIG. 10. For much of the following description, it is assumed that the identifiable portion of the handheld sporting implement is its head, however that need not be the case. For another example, a ring that is painted around a portion (e.g., the center) of a bat or other handheld sporting implement can be the identifiable portion.

Still referring to FIG. 2, step 210 involves approximating a piecewise 3D trajectory of at least the head (and/or any other identifiable portion) of the handheld sporting implement based on the probable locations in 3D space of the head (and/or any other identifiable portion) of the handheld sporting implement (identified at step 208 for each of the plurality of instants during which the handheld sporting implement was swung by the athlete). Additional details of step 210, according to a specific embodiment of the present technology, are described below with reference to FIG. 12. In certain embodiments, extrapolation techniques can be used to extrapolate the path and/or orientation of the handheld sporting implement beyond (prior to and/or after) the timespan during which images of the swung handheld sporting implement are captured using the cameras 160.

Figure 4:
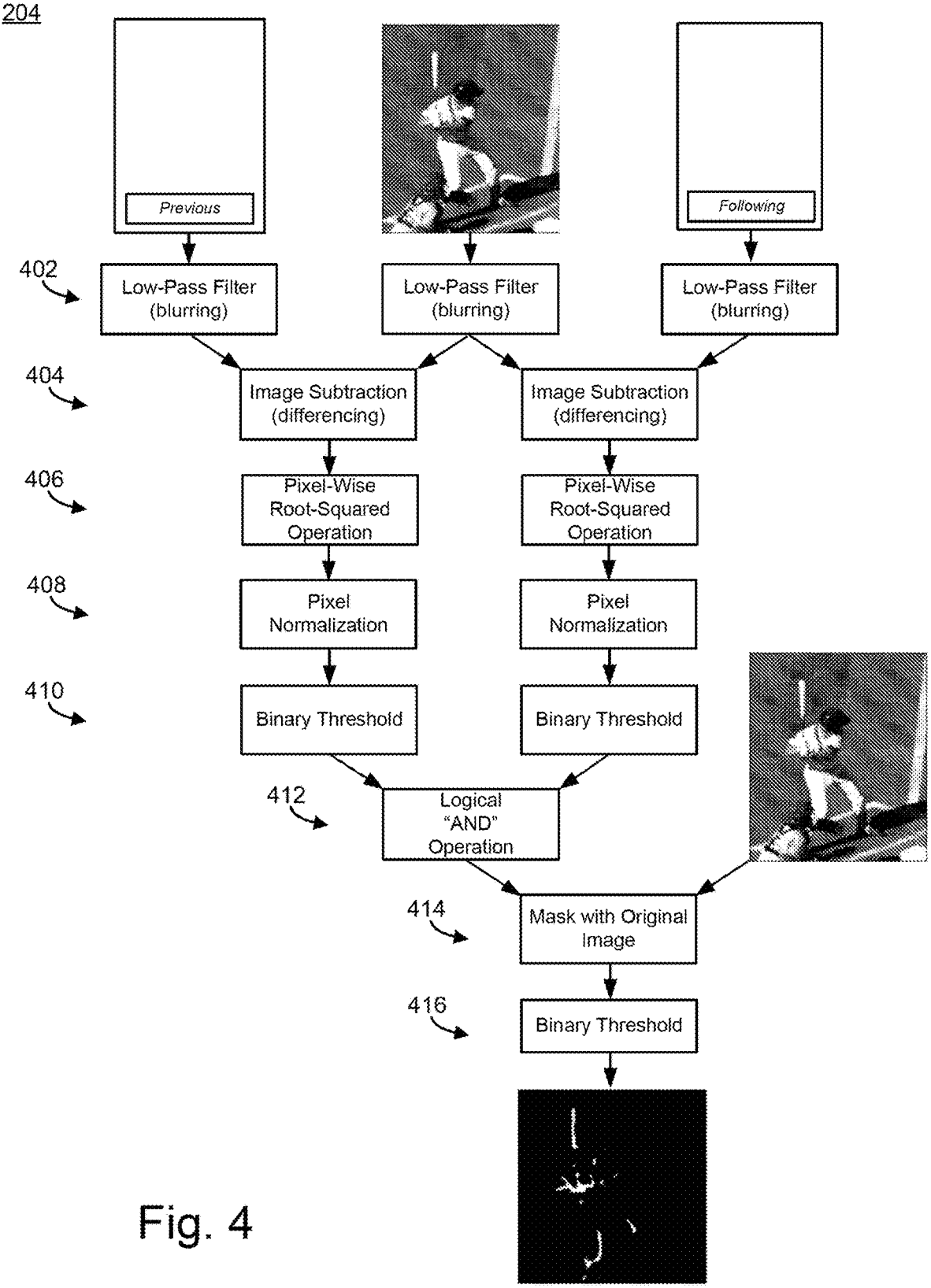
FIG. 4 is a high level flow diagram that is used to describe additional details of how motion regions within a video image can be identified at step 204 initially discussed with reference to FIG. 2.

Additional details of step 204, according to a specific embodiment of the present technology, are now described with reference to FIG. 4. More specifically, FIG. 4 is used to describe additional details of how to identify one or more motion regions within a video image. Referring to FIG. 4, in the center at the top of the page is shown an exemplary video image for which one or more motion regions are to be identified. This video image shown in the center at the top of FIG. 4, which can be referred to as the present or current image, is the same as the video image shown in FIG. 3A. To the left and right of the present video image are blocks representative of, respectively, previous and following video images within a sequence of video images captured using the same camera 160.

Still referring to FIG. 4, at step 402 the previous, present and following video images are each low-pass filtered, which results in a blurring of each of the images. The purpose of step 402 is to reduce image noise. Step 402 can be performed, e.g., by applying a Gaussian blur to each of the previous, present and following video images, but is not limited thereto. At step 404, image subtractions are performed to determine the difference between the present video image and the previous video image, and to determine the difference between the present video image and the following video image. At step 406, a pixel-wise root-squared operation is performed on the results of the image subtractions performed at steps 404 to thereby diminish smaller values, amplifier larger values and invert negative values. Step 406 could be replaced with a pixel-wise absolute-difference operation, which would likely be faster and produce very similar results. At step 408, the results from step 406 are normalized by stretching pixel values to a full grayscale range. At step 410 a binary threshold is applied to the results of step 408 to convert pixels to either white or black. Such a binary threshold can be the middle of the full grayscale range, but other binary thresholds are also possible. In an embodiment of step 410, pixels having a grayscale above the binary threshold are converted to white, with all other pixels being converted to black. At step 412, a logical "AND" operation is applied to the results of step 410 to thereby maintain only pixels that are white in the results of both instances of step 410. At step 414, the result of the logical "AND" operation performed at step 412 is masked with the original (i.e., present) image (shown in the center at the top of the page, and to the right of the step labeled 412) in order to maintain original pixels at locations of white mask pixels. At step 416, a further binary threshold is applied to the results of the masking at step 414, to thereby cause pixels in which both motion was detected and which were brightly colored in the original scene (such as those of the brightly-colored baseball bat) to be represented in white, with all other pixels represented in black. The threshold used at step 416 can be inverted to detect darkly-colored bats (or other handheld sporting implements), where all pixels at locations of the motion mask in the original scene that have pixel intensities below the threshold level are converted to white, and all others are converted to black. The result of step 416 is shown at the bottom of the page, which is the same as that which is shown in FIG. 3B. The steps described with reference to FIG. 4 can be performed for each (or some) of the video images included in each (or some) of the different sets of video images captured by the different cameras 160A, 160B and 160C, to thereby identify one or more motion regions in each of the video images, and more generally, to perform step 204 in FIG. 2.

Figure 5:
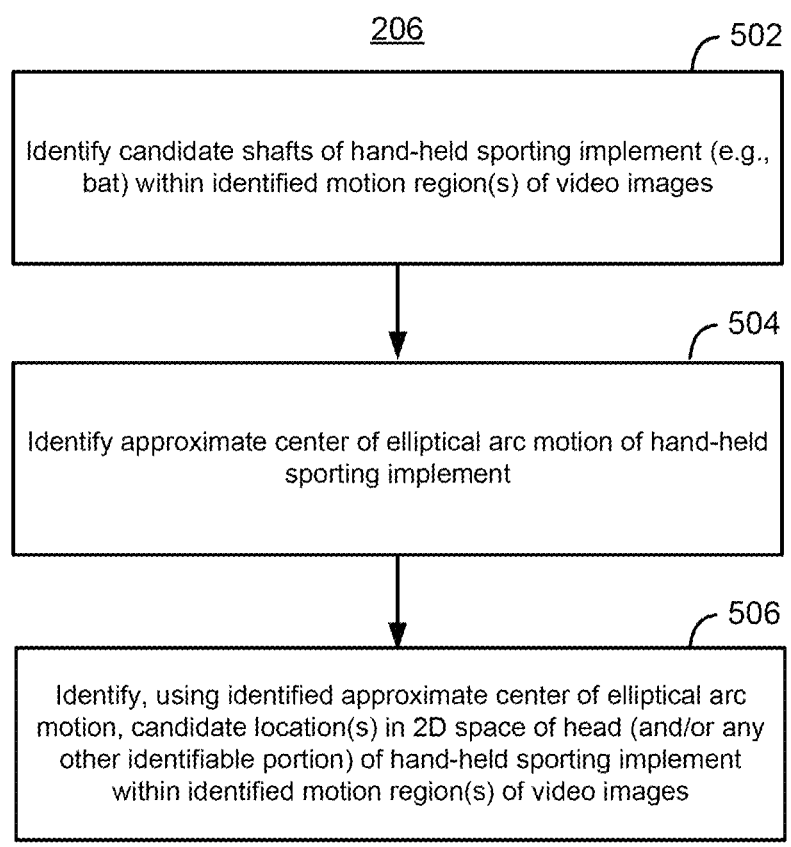
FIG. 5 is a high level flow diagram that is used to describe additional details of how candidate locations in 2D space of a head of a handheld sporting implement can be identified at step 206 initially discussed with reference to FIG. 2.

Additional details of step 206, according to a specific embodiment of the present technology, are now described with reference to FIG. 5. More specifically, FIG. 5 is used to describe additional details of how to identify one or more candidate locations (in 2D space) of a head (and/or any other identifiable portion) of a handheld sporting implement within identified motion region(s) of a video image. Referring to FIG. 5, step 502 involves identifying one or more candidate shafts of the handheld sporting implement (e.g., bat) within the identified motion region(s) of the video images. Step 502 can be performed by outlining the regions of motion within each of a plurality of the video images in each of the sets of video images, and then identifying nominally straight lines within the outlined regions of motion. Exemplary outlined regions of motion within a video image are labeled 304 in FIG. 3C. Exemplary nominally straight lines (that are identified within the outlined regions of motion 304) are labeled 306a, 306b and 306c in FIG. 3C. In accordance with an embodiment, a Canny edge detector algorithm is used to perform the outlining of the regions of motion. In accordance with an embodiment, a Hough transform is used to identify the nominally straight line segments within the outlined regions of motion. The use of alternative and/or additional algorithms are also possible. In order to avoid duplicate lines, nominally parallel lines within close proximity can be merged, e.g., by averaging the lines, such as the two long, nominally parallel lines labeled 306a.

Referring again to FIG. 5, step 504 involves identifying an approximate center of elliptical arc motion of the handheld sporting implement that is swung by an athlete. Additional details of step 504, according to a specific embodiment of the present technology, are described below with reference to FIGS. 6 and 7. Still referring to FIG. 5, step 506 involves using the approximate center of elliptical arc motion (identified at step 504) and one or more candidate shafts (identified at step 502) to identify the one or more candidate locations (in 2D space) of the head of the handheld sporting implement within the identified motion region(s) of the video images. Additional details of step 506, according to a specific embodiment of the present technology, are described below with reference to FIG. 8.

Figure 6:
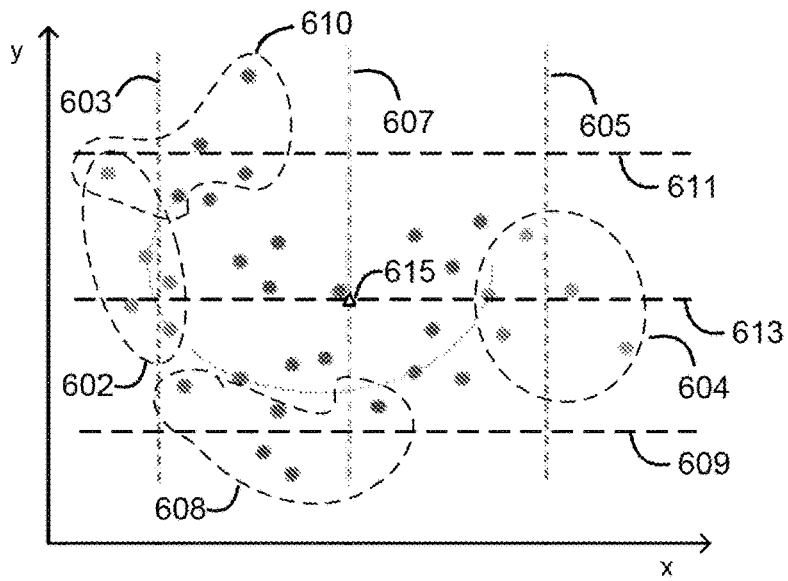
FIG. 6 includes dots that represent candidate heads of a handheld sporting implement determined from a plurality of video images captured using a same camera while an athlete swung the handheld sporting implement.
Figure 7:
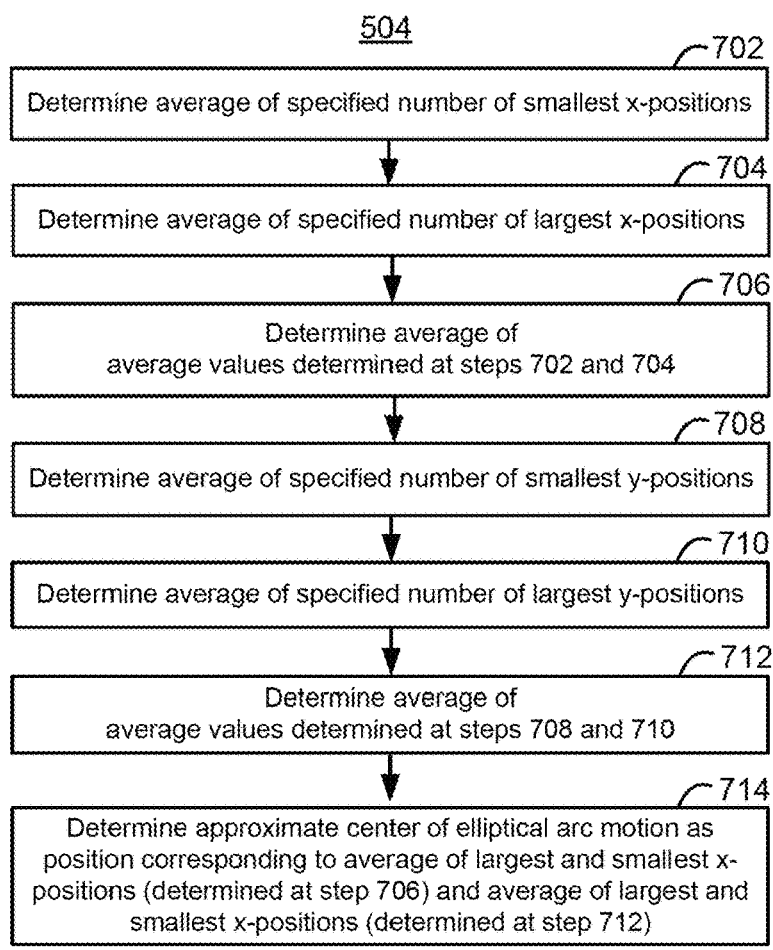
FIG. 7 is a high level flow diagram that is used, together with FIG. 6, to describe additional details of how to identify an approximate center of elliptical arc motion of a swung handheld sporting implement at step 504 initially discussed with reference to FIG. 5.

Additional details of step 504, according to a specific embodiment of the present technology, are now described with reference to FIGS. 6 and 7. In FIG. 6, the dots shown therein represent candidate heads (or another identifiable portion) of the handheld sporting implement determined from a plurality of video images captured using a single one of the cameras 160A, 160B and 160C while an athlete swung the implement. Referring to the high level flow diagram of FIG. 7, at step 702 a specified number (e.g., 5) of the smallest x-positions are identified and averaged. The dots within the dashed oval 602 in FIG. 6 correspond to the 5 smallest x-positions, and the dashed line 603 is representative of the average of these smallest x-positions. At step 704, a specified number (e.g., 5) of the largest x-positions are identified and averaged. The dots within the dashed oval 604 in FIG. 6 correspond to the 5 largest x-positions, and the dashed line 605 is representative of the average of these largest x-positions. At step 706, the average values determined at steps 702 and 704 are averaged to determine an average of the largest and smallest x-positions, which is represented by the dashed line 607. At step 708, a specified number (e.g., 5) of the smallest y-positions are identified and averaged. The dots within the dashed region 608 in FIG. 6 correspond to the 5 smallest y-positions, and the dashed line 609 is representative of the average of these smallest y-positions. At step 710, a specified number (e.g., 5) of the largest y-positions are identified and averaged. The dots within the dashed region 610 in FIG. 6 correspond to the 5 largest y-positions, and the dashed line 611 is representative of the average of these largest y-positions. At step 712, the average values determined at steps 708 and 710 are averaged to determine an average of the smallest and largest y-positions, which is represented by the dashed line 613. At step 714, an approximate center of elliptical arc motion of the handheld sporting implement, which center is represented by the triangle 615, is determined to be the position corresponding to the average of the largest and smallest x-positions (as determined at step 706) and the average of the largest and smallest y-positions (as determined at step 712). The specific number of x- and y-positions that are averaged in the steps in FIG. 7 can be more than or fewer than 5. Alternative techniques for determining a center of elliptical arc motion of a handheld sporting implement that is swung by an athlete are possible and can be used with embodiments described herein.

Figure 8:
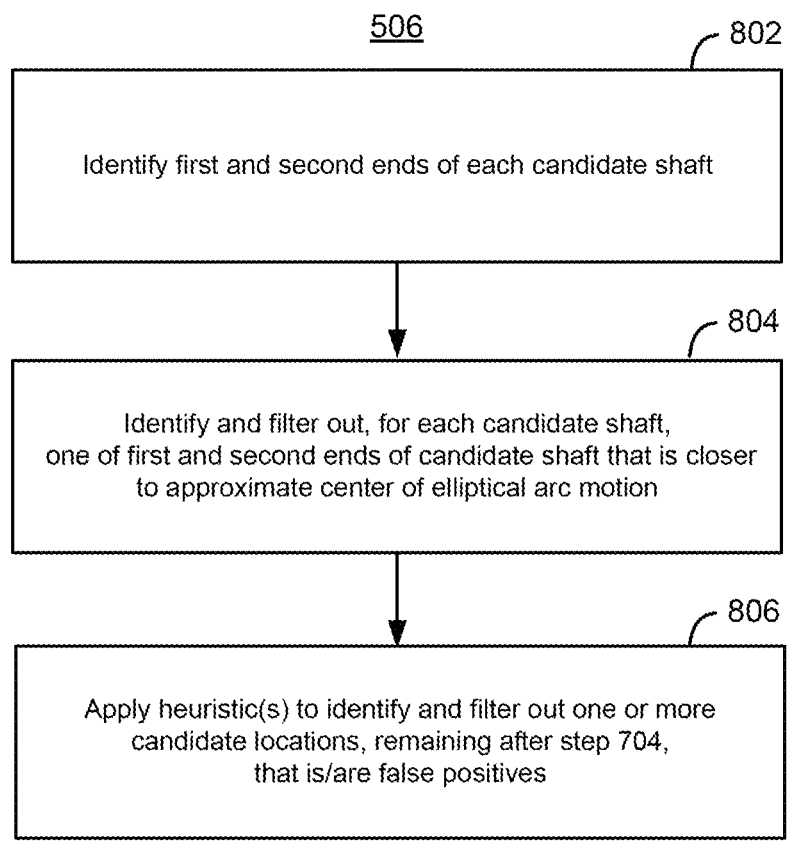
FIG. 8 is a high level flow diagram that is used to describe additional details of how to identify candidate location(s) in 2D space of a head of a handheld sporting implement within identified motion region(s) of a video image at step 506 initially discussed with reference to FIG. 5.

Additional details of step 506, according to a specific embodiment of the present technology, are now described with reference to FIG. 8. More specifically, the high level flow diagram of FIG. 8 is used to explain how an approximate center of elliptical arc motion, which was identified at step 504, can be used to identify one or more candidate locations (in 2D space) of a head of a handheld sporting implement within identified motion region(s) of a video image. Referring to FIG. 8, step 802 involves identifying first and second ends of each of the one or more candidate shafts. Referring briefly back to FIG. 3C, lines 306a, 306b and 306c are illustrative of exemplary candidate shafts. In FIG. 3C, the labels 312a and 312b point to the first and second ends of the candidate shaft represented by the line 306a, the labels 312c and 312d point to the first and second ends of the candidate shaft represented by the line 306b, and the labels 312e and 312f point to the first and second ends of the candidate shaft represented by the line 306c. Referring again to FIG. 8, step 806 involves, for each of the candidate shafts, identifying and filtering out the one of the first and second ends of the candidate shaft that is closer to the approximate center of elliptical arc motion of the shaft, whereby the non-filtered out ones of the first and second ends remain as candidate locations in 2D space of the head of the handheld sporting implement within the identified motion region(s) of a video image. In FIG. 3C, the triangle labeled 315 is representative of the approximate center of elliptical arc motion of the shaft as determined at step 504. Still referring to FIG. 3C, for the candidate shaft 306a, the end 312b is filtered out since it is closer than the other end 312a to the triangle 315. For the candidate shaft 306b, the end 312d is filtered out since it is closer than the end 312c to the triangle 315. For the candidate shaft 306c, the end 312e is filtered out since it is closer than the end 312f to the triangle 315. Accordingly, the remaining candidate locations (in 2D space) of the head of the handheld sporting implement are the ends 312a, 312c and 312f.

Referring again to FIG. 8, step 806 involves applying one or more heuristics to identify and filter out one or more of the candidate locations of the head or another identifiable portion of the handheld sporting implement (remaining after step 804) that is/are determined to be false positives. Such heuristics can use the approximate center of elliptical arc motion that was identified at step 504. One heuristic can involve enforcing a unidirectional, elliptical path of motion in the time domain, as it is expected that a head of a handheld sporting implement will move in a single direction and in an approximately elliptical path when being swung. Another heuristic can involve enforcing minimum and/or maximum object length thresholds. For example, wherein the identifiable portion of the handheld sporting implement is the head, for each of the candidate heads (e.g., bat heads), the Euclidean distance from the approximate center of elliptical arc motion to the candidate bat head can be calculated. The calculated distances can then be compared to a minimum distance threshold which specifies a minimum expected distance that a bat head will be from the approximate center of elliptical arc motion when a bat is swung. The calculated distances can also be compared to a maximum distance threshold which specifies a maximum expected distance that the bat head will be from the center of elliptical arc motion when the bat is swung. Candidate heads that have a distance (from the approximate center of elliptical arc motion) that is less than the minimum distance threshold or greater than the maximum distance threshold are filtered out. The use of additional and/or alternative heuristics are also possible and within the scope of embodiments of the present technology. The heuristics may depend upon what identifiable portion of the handheld sporting implement is being identified and tracked.

Figure 9:
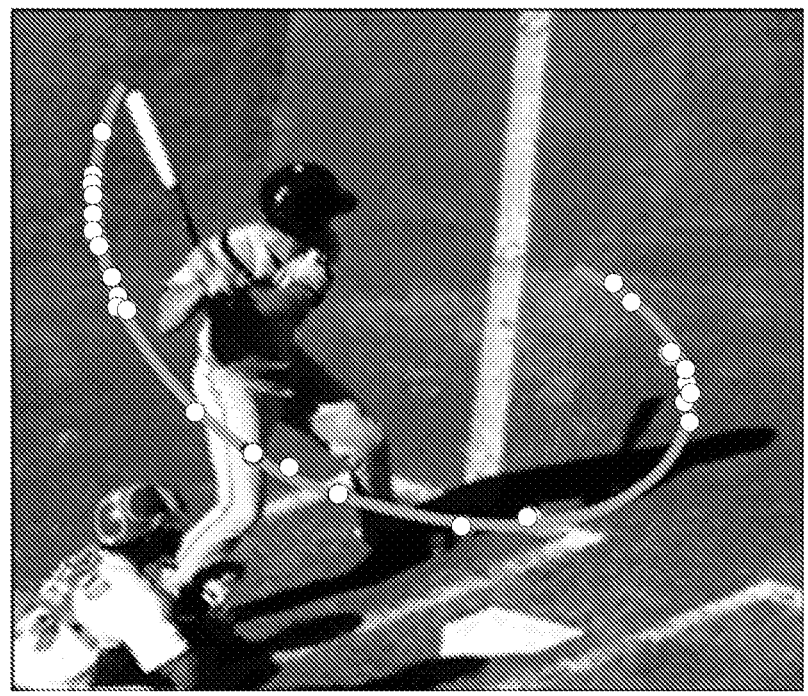
FIG. 9 includes dots and an elliptical arc that are superimposed on a video image of an athlete holding a bat during the start of a swinging motion, wherein the superimposed dots are illustrative of candidate locations in 2D space of the head of the bat that were identified for a plurality of video images that followed the video image shown in FIG. 9, after false positives were filtered out, and wherein the superimposed elliptical arc is illustrative of an estimated trajectory of the head of the bat during the swing.

Referring now to FIG. 9, illustrated therein is a video image of an athlete holding a bat during the start of a swinging motion. The white circles that are superimposed on the video image shown in FIG. 9 are illustrative of candidate locations in 2D space of the head of the bat that were identified at step 206 for a plurality of video images that followed the video image shown in FIG. 9, after false positives were filtered out. The elliptical arc superimposed on the video image shown in FIG. 9 is illustrative of the trajectory of the head of the bat during the swing.

Figure 10:
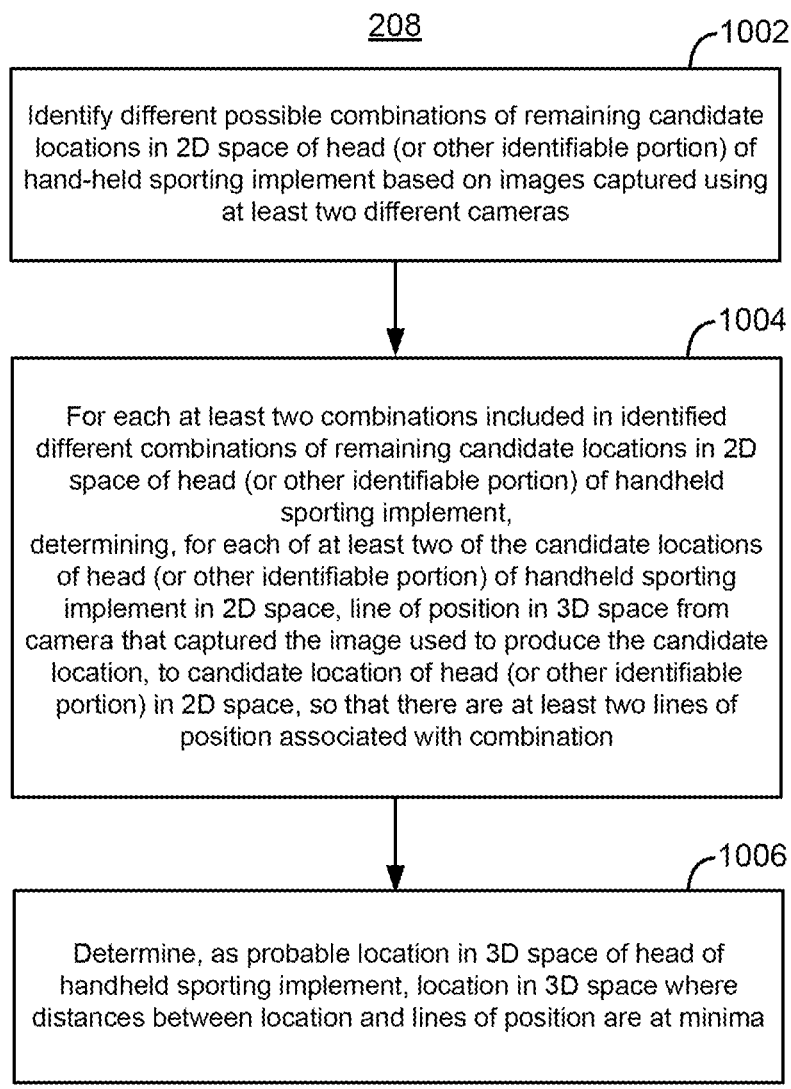
FIG. 10 is a high level flow diagram that is used to describe additional details of how to identify a probable location in 3D space of a head of a handheld sporting implement at step 208 initially introduced with reference to FIG. 2.

Additional details of step 208, according to a specific embodiment of the present technology, will now be described with reference to FIG. 10. More specifically, FIG. 10 is a high level flow diagram that is used to describe how to identify from the candidate locations (in 2D space) of the head of the handheld sporting implement, a probable location in 3D space of the head of the handheld sporting implement for each of a plurality of instants during which handheld sporting implement was swung by an athlete. The steps described with reference to FIG. 10 are performed for each of a plurality of instants during which the handheld sporting implement was swung by the athlete, so that the path of the swing can be approximated at step 210. As mentioned above, the plurality of instants can be all of the times that video images of a swing were captured using two or more of the cameras 160A, 160B and 160C, or just some of those times.

Referring to FIG. 10, step 1002 involves identifying different possible combinations of the remaining candidate locations (CL) in 2D space of the head (or other identifiable portion) of the handheld sporting implement that are based on images captured using at least two different ones of the cameras, wherein no single combination should include two or more candidate locations captured using the same camera. For example, assume that each of the cameras 160A, 160B and 160C captured a separate video image of an athlete swinging a bat at a same point in time (i.e., at a same instant), due to the cameras being synchronized, wherein the captured video images can be respectively referred to as video images A, B and C. Also assume that after filtering out candidates that were false positives (e.g., at steps 704 and 706), the video image A included two candidate locations for the head (referred to as CL-A-1 and CL-A-2), the video image B included one candidate location for the head (referred to as CL-B), and the video image C included two candidate locations for the head (referred to as CL-C-1 and CL-C-2). The different possible combinations of these candidate heads from the video images A, B and C, captured using at least two different ones of the three cameras (with no single combination including two or more candidates captured using the same camera), include the following combinations:

CL-A-1 and CL-B;
CL-A-2 and CL-B;
CL-A-1 and CL-C-1;
CL-A-2 and CL-C-1;
CL-A-1, CL-B and CL-C-1;
CL-A-1, CL-B and CL-C-2;
CL-A-2, CL-B and CL-C-1;
CL-A-2, CL-B and CL-C-2;
CL-B and CL-C-1; and
CL-B and CL-C-2.

If for a same point in time (i.e., instant) there is only one candidate location of the head per image captured by N separate synchronized cameras (e.g., 160), then the following equation can be used to calculate the amount of all possible combinations of candidate locations for the head, where each combination includes either zero or one candidate location for the head per separate camera, and where each combination includes candidate locations for the head associated with at least two separate cameras:

$$\text{\# of combinations} = \sum_{n=2}^{N} \frac{N!}{n!(N-n)!}.$$

Step 1004 involves, for each of the different possible combinations (of remaining candidate locations in 2D space of the head of the handheld sporting implement) identified at step 1002, determining a corresponding line of position (LOP) in 3D space for each candidate location in 2D spec of the head of the handheld sporting implement (that is included in the possible combination). In accordance with an embodiment, a transformation matrix is used to perform step 1004, wherein the transformation matrix is determined based on knowledge of parameters of the cameras 160A, 160B and 160C, which parameters can include position, orientation, angular width, and lens distortion characteristics of each of the cameras, but are not limited thereto. Exemplary orientation type parameters can include tilt and/or pan of each of the cameras. In other words, at step 1004, corresponding candidate head locations in 2D space, as determined from 2D images captured using different cameras, can each be transformed into an LOP in 3D space using a transformation matrix. An exemplary transformation matrix M is shown below, wherein the transformation matrix M relates a 2D image coordinate system to a 3D world coordinate system:

$$M = \begin{pmatrix} m00 & m01 & m02 & m03 \\ m10 & m11 & m12 & m13 \\ m20 & m21 & m22 & 1 \end{pmatrix}.$$

The values in the transformation matrix M, for use with one of the cameras 160, can be determined during a calibration procedure for that camera 160, which can also be referred to as registration. The calibration procedure can involve aiming a camera 160 at different reference fiducials in an event facility (e.g., baseball park), wherein actual locations of the reference marks are known, e.g., using surveying equipment. Values within the matrix can then be solved for using the capturing images of the fiducials, parameters of the camera used to capture the images of the fiducials, and the actual locations of the fiducial (e.g., as determined using surveying equipment). For one example, the tip of home plate may be a fiducial. In an embodiment where unsynchronized cameras are implemented, the conversion from 2D space to 3D space may involve fitting screen points visible in each camera to a model of a swing. This may be done in ways similar to those described in commonly assigned U.S. Pat. No. 8,335,345, entitled "Tracking an Object with Multiple Asynchronous Cameras," which is incorporated herein by reference, but other techniques can be used as well.

Step 1004 is performed such that there are at least two lines of position associated with each combination. This can be better understood with reference to FIG. 11, which shows lines of position 1102A, 1102B and 1102C from cameras 160A, 160B and 160C, respectively, wherein each line of position 1102 represents an imaginary straight line that extends from a camera 160 to a tracked object (the head of a handheld sporting implement, in this example) at a given point in time, and identifies a locus of points at which the object could be located based on the camera's observation. Thus, for camera 160A, lines of position extend from the camera 160A to the different positions of the tracked object (the head of a handheld sporting implement, in this example) at the different times the images of the object are captured by camera 160A. The example line of position (LOP) 1102A represents a line which extends from the camera 160A through the tracked object (the head of a handheld sporting implement, in this example) at a single point in time. The example LOP 1102B represents a line which extends from the camera 160B through the head of the handheld sporting implement at the same point in time, and the example LOP 1102C represents a line which extends from the camera 160C through the head of the handheld sporting implement at the same point in time.

Figure 11:
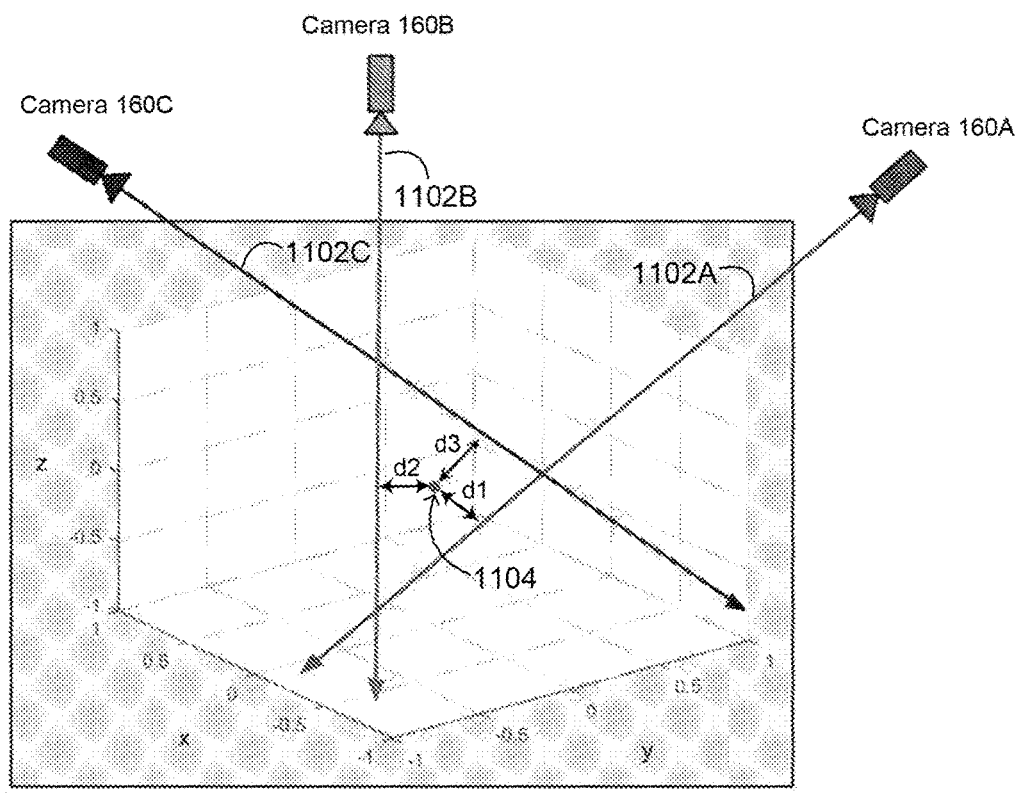
FIG. 11 shows lines of position from three cameras, wherein each line of position represents an imaginary straight line that extends from a camera to a tracked object (the head of a handheld sporting implement, in this example) at a given point in time, and identifies a locus of points at which the object could be located based on the camera's observation.

Referring again to FIG. 10, step 1006 involves determining, as the probable location in 3D space of the head of the handheld sporting implement for an instant, a location in 3D space where distances between the location and the lines of position are at a minima. In FIG. 11, the calculated probable location 1104 in 3D space of the head of the handheld sporting implement is at distances d1, d2 and d3 from the lines of position 1102A, 1102B and 1102C, respectively. Geometric principles can be used to obtain equations which express the distance (or square of the distance) from each of the lines of position to an unknown position. A minima for the equations can then be determined to obtain the probable location in 3D space of the head of the handheld sporting implement which meets the distance metric. For example, a distance metric can expressed as (d1+d2+d3) or (d1.sup.2+d2.sup.2+d3.sup.2), and can be minimized to find the probable location in 3D space of the head of the handheld sporting implement. There are multiple different ways in which distance metrics can be defined. Also, there are multiple different ways in which a minima can be defined. The probable location in 3D space can also be determined by a metric that takes into account the number of LOPs and quality of candidate heads identified in 2D space. In certain embodiments, this may enable outlier candidate heads and/or LOPs to be removed from a pool of LOPs, and subsequent iteration of prior steps to be performed, if necessary or desired. The algorithm described with reference to FIG. 10 is an example of a clustering algorithm. Other types of clustering algorithms can alternatively be used. As noted above, the portion of the camera from which the LOP extends may be the center of projection of the lens of the camera.

Figure 12:
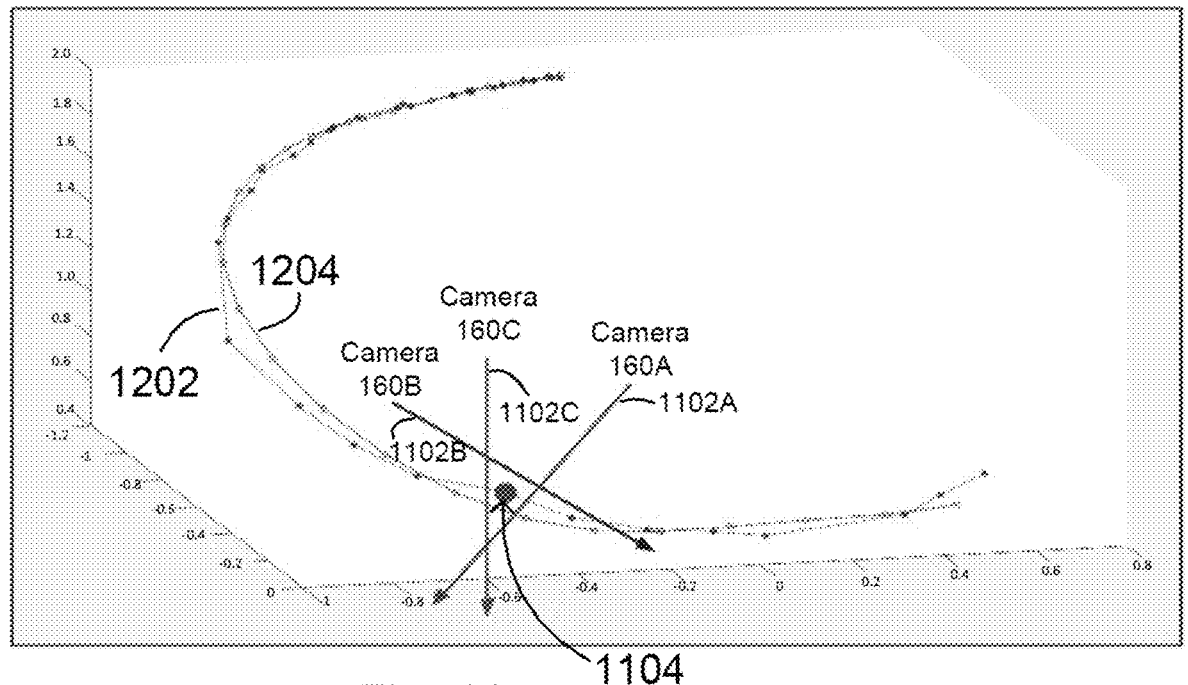
FIG. 12 illustrates an approximated piecewise 3D trajectory of the head of a handheld sporting implement that is based on identified probable locations in 3D space of the head of the handheld sporting implement.

Additional details of step 210, according to a specific embodiment of the present technology, are now described below with reference to FIG. 12. As explained above in the discussion of FIG. 2, step 210 involves approximating a piecewise 3D trajectory of at least the head of the handheld sporting implement based on the probable locations in 3D space of the head of the handheld sporting implement (identified at step 208 for each of the plurality of instants during which the handheld sporting implement was swung by the athlete). In FIG. 12, the dots along the jagged line 1202 are probable locations in 3D space of the head of the handheld sporting implement, which were identified at step 208 for each of the plurality of instants during which the handheld sporting implement was swung by the athlete. In FIG. 12, the smooth line 1204 is illustrative of an approximated piecewise 3D trajectory of the head of the handheld sporting implement that is based on the probable locations in 3D space of the head of the handheld sporting implement. In accordance with an embodiment, a B-spline algorithm is used to approximate the piecewise 3D trajectory of the head of the handheld sporting implement. Instead of using a B-spline algorithm, another type of curve fitting algorithm can be used. In another embodiment, a physics model of an athlete swinging a bat (or some other handheld sporting implement) can be determined and used to approximate the piecewise 3D trajectory of the head of the handheld sporting implement. Other variations are also possible, and within the scope of embodiments of the present technology. It is noted that in certain embodiments a piecewise 3D trajectory can include multiple pieces that collectively cover the entire trajectory, while in other embodiments a piecewise 3D trajectory can include a single piece that covers the entire trajectory. In other words, a sequence of functions can be used to approximate the piecewise 3D trajectory in successive pieces, or a single function can cover the entire piecewise 3D trajectory.

Figure 13A:
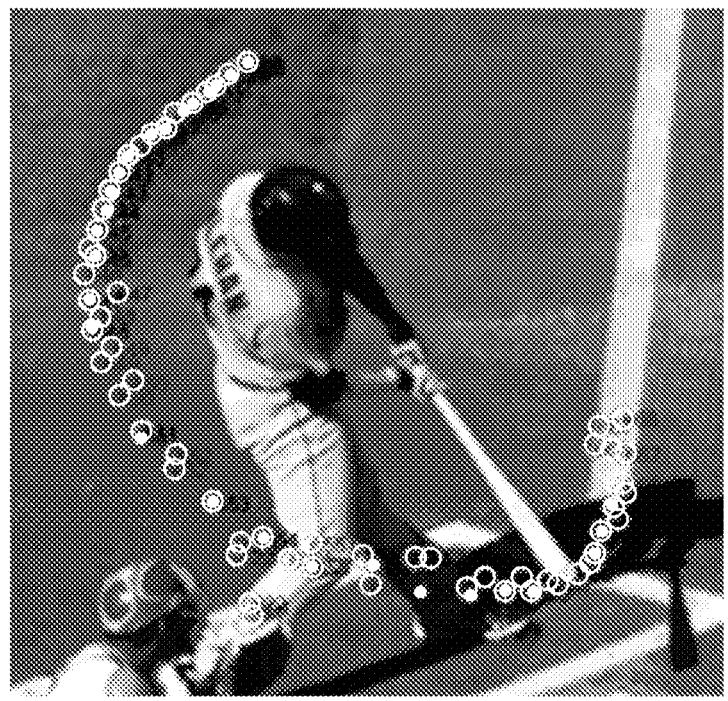
FIGS. 13A and 13B illustrates candidate locations of a bat head and probable locations of the bat head, as determined from the candidate locations, after they had been projected from 3D space back into 2D space and superimposed on video images of the handheld sporting implement being swung.
Figure 13B:
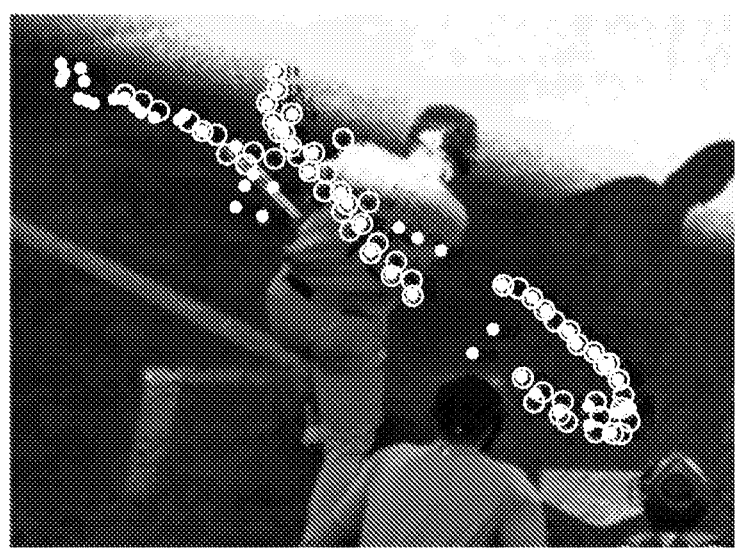

The probable location in 3D space of the head of the handheld sporting implement that is selected (at step 206) for each of a plurality of instants in time during which the handheld sporting implement is swung can, if desired, be converted back into 2D space (e.g., using an inverse of the transformation matrix M), and superimposed on one or more video images of the handheld sporting implement being swung. Examples of this are shown in FIGS. 13A and 13B, in which the open or non-filled in circles represent candidate locations in 2D space of the baseball bat head (as determined at step 208), and the solid or filled in circles represent the probable locations in 3D space of the bat head (as determined at step 208). The 2D screen or image space shown in FIG. 13A is captured by the camera 160A. The 2D screen or image space shown in FIG. 13B is captured by the camera 160B. More generally, a 2D video of an athlete swinging a handheld sporting implement can be enhanced to visually show the path of the entire shaft, or just the head, of the handheld sporting implement. In certain embodiments, an error score can be computed after back-projection into 2D space, which can involve computing a difference between an interpolated line passing roughly through the solid circles and the solid circles themselves. If a probable location has an error exceeding a specified threshold, then it can be discarded. Subsequent iteration of prior steps may be performed if necessary or desired. Other embodiments could discard a probable location by evaluating it in 3D space. One example would be a measure of how tightly the candidate LOPs are clustered; if that measurement exceeds a specified threshold, then that particular combination of LOPs can be discarded.

The above discussion described how to track the path of the head of a handheld sporting implement (e.g., a baseball bat) that is swung by an athlete. Such embodiments can be extended to enable tracking of the path of the entire handheld sporting implement (e.g., an entire baseball bat) that is swung. Such additional steps can be performed at the same time as some of the steps described above, e.g., with reference to FIG. 2, or they can be performed at a later time than some of the steps described above, depending upon implementation. More generally, a bat head search can be extended to a full bat search by means of locating screen-space correspondences of a pair of points (corresponding to the head and the knob), and the line between them. For example, in FIG. 3C, lines detected in a motion image are illustrated. Those lines are defined by two endpoints, which include the aforementioned bat head as well as the end nearest the hands, which is referred to herein as the knob, as noted above.

Referring to FIG. 2, as part of step 206, in parallel with step 206, or at some other time, one or more candidate locations in 2D space of the knob of the handheld sporting implement can also be identified within the identified motion region(s) of the video image, for at least a subset of the video images included in each of the different sets of video images. Still referring to FIG. 2, as part of step 208, in parallel with step 208, or at some other time, a probable location in 3D space of the knob of the handheld sporting implement can be identified from the candidate locations in 2D space of the knob of the handheld sporting implement, for each of the instants that a probable location in 3D space of the head of the handheld sporting implement is/was identified. Still referring to FIG. 2, as part of step 210, in parallel with step 210, or at some other time, a piecewise 3D trajectory of the knob of the handheld sporting implement can be approximated from the probable locations in 3D space of the knob of the handheld sporting implement identified for each of the plurality of instants during which the handheld sporting implement was swung by the athlete. Additionally, for each of the plurality of instants (for which a probable location of the knob is identified) a line is extended between the head and the knob to represent a probable location in 3D space of the shaft of the handheld sporting implement for the instant. The length of the shaft can be assumed to be the length between an identified head and an identified knob. Alternatively, a line representing the handheld sporting implement (e.g., a baseball bat) can be extrapolated, in 3D space, from the probable location of the head through the probable location of the knob, terminating at a specified length (e.g., 33 inches) from the probable location of the head. It is practical to assume the bat length is 33 inches, which is the length of a typical baseball bat, which typically only varies +/−one inch. The one inch length variation at the knob end of the bat (or other handheld sporting implement) will be inconsequential, since this part of the bat only contacts a ball in rare cases.

Figure 14:
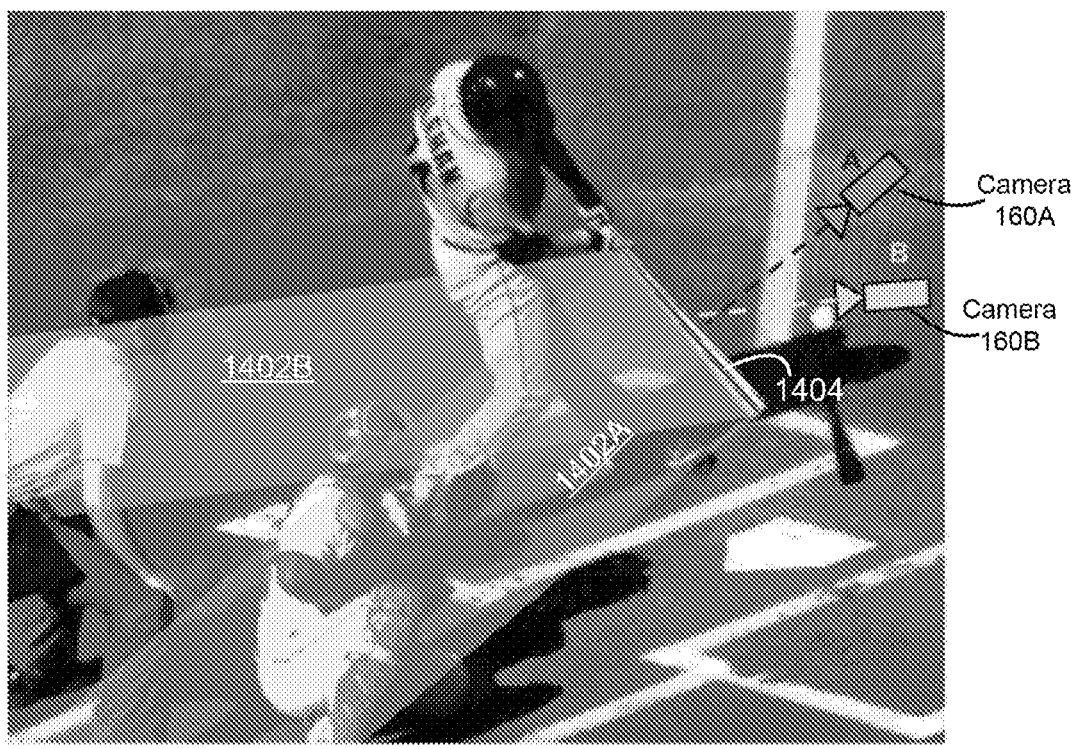
FIG. 14 is used to illustrate how the path of an entire shaft of a handheld sporting implement that is swung by an athlete can be tracked, in accordance with certain embodiments.

By connecting interpolated, time-synchronized probable bat head locations with probable bat knob locations, in the manner described above, 3D bat "lines" that pass axially through the center of the bat are derived. From the perspective of each individual camera 160, lack of depth perception means an actual 3D bat line could lie anywhere in a plane extruded from the bat, both toward and away from the camera, as depicted in FIG. 14 with a two-camera configuration. A line 1404 formed by the intersection of camera 160A's plane 1402A and camera 160B's plane 1402B, is determined to be the 3D location of the bat.

In the above discussion, the embodiments described herein were typically described as being used to track the path and/or orientation of at least a portion (e.g., the head) of a baseball bat that is swung by an athlete. However, as noted above, embodiments described herein can additionally or alternatively be used to track the path and/or orientation of other types of handheld sporting implements that are swung by an athlete, such as, but not limited to, a cricket bat, a golf club, or a hockey stick. Embodiments of the present technology can also be used to track the path and/or orientation of at least a portion of a racket type of handheld sporting implement, used, e.g., to play tennis, squash, or racquetball. When tracking a racket type of handheld sporting implement, the entire racket head, the most distal end of the racket head, or the throat of the tennis racket (which is typically v-shaped or triangular), are examples of identifiable portions of a tennis racket that can be tracked. It is also possible, and within the scope of the embodiments described herein, to use embodiments of the present technology to track the path and/or orientation of portions of still other types of handheld sporting implements that are swung by an athlete, such as, but not limited to, a cesta (used in Jai alai), a foil (used in fencing), a fighting stick (used in martial arts). Where a handheld sporting implement does not include a relatively straight shaft, certain algorithms described above may be modified to account for the different overall shape of the sporting implement. Also, where the handheld sporting implement is intended to be maneuvered in specific manners by an athlete, the expected trajectories can be taken into account to modify some of the algorithms described above, to better customize the algorithms for the sporting implement and sport.

Once the path and/or orientation of the head, shaft and/or other portion(s) of a handheld sporting implement that is swung is/are determined, a graphical representation of the path and/or orientation of the head and/or shaft (and/or other portion(s)) can be superimposed over video images to enhance the video images. This can enable the analysis of an athlete's swing in order to improve and or otherwise adjust the athlete's swing to improve their performance and/or reduce the chance of injury.

Additionally, an athlete's swinging of a handheld sporting implement can be correlated with results of the swing in order to detect correlations therebetween and provide feedback to improve performance. For example, certain tendencies of an athlete can be identified in order to improve the athlete's performance. Through such an analysis there can be a determination, e.g., that an athlete tends to swing upward at certain types of pitches (e.g., fastballs), which results in pop-ups that are easily caught by the defense. Based on this analysis, the athlete may be instructed to try swinging in a more level manner when swinging at fastballs. For another example, there may be a determination that an athlete tends to swing too early in response to curveballs, and based on that analysis the athlete may be instructed to try swinging a little later when swinging at curveballs. For still another example, embodiments described herein can be used to identify flaws in a golfer's swing that result in the golfer slicing their drives, or the like. These are just a few examples, which are not intended to be all-encompassing.

Beneficially, embodiments described herein can track how an athlete swings a handheld sporting implement in an uninstrumented, unobstructed fashion, using as few as two cameras without requiring that an athlete wear a special suit that is typically required by motion capture systems. More specifically, many motion capture systems operate by having the actor (e.g., an athlete) wear special reflective or illuminating markers that make accurate motion capture possible. Instead of using these markers—or in addition to using them—typical motion capture systems often use a large collection of cameras (perhaps more than ten) to record the action from a variety of different angles. Those that use such markers inevitably inhibit the motion of their actors (in this case, athletes) via the placement of unfamiliar objects on the actors' bodies. These markers, along with the very controlled, constrained, and unfamiliar environments in which motion capture systems exist, likely cause the actors to move in subtly different ways from their natural, in situ behavior. Further, these markers can typically not be worn in an actual game or match, and thus, can typically only be used in very controlled practices.

Conventionally, swing analysis for sports, such as golf, were constrained to 2D space. For example, derivation of the golf club swing trajectory is achieved in "Visual Golf Club Tracking for Enhanced Swing Analysis," N. Gehrig, British Machine Vision Conference, September 2003. However, this work involves strictly one camera, which must be positioned directly in front of the athlete, where "in front" refers to the camera being directed at the athlete's face when the athlete's head is not turned. This may not be practical in actual games or matches, and would likely only be practical where the athlete is performing a practice swing that is not intended to make contact with a ball. Embodiments described herein enable swing analysis to be expanded into 3D world space. Further, embodiments described herein can be used to perform swing analysis from video images captured during actual games or matches, as well as during practice sessions.

Most of the functionality described herein may be implemented using one or more processor readable storage devices having processor readable code embodied thereon for programming one or more processors to perform the processes described herein. The processor readable storage devices can include computer readable media such as volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed embodiments. For example, it would be possible to combine or separate some of the steps shown in FIG. 2, and/or in other flow diagrams. Further, it may be possible to change the order of some of the steps described above, without substantially changing the overall events and results, e.g., in instances where a step doesn't rely on the results of a previous step.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

The above-mentioned examples are provided to serve the purpose of clarifying the aspects of the invention, and it will be apparent to one skilled in the art that they do not serve to limit the scope of the invention. By way of example, the system can be applied to any object approaching a person. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A method for tracking a sporting implement during a sporting event, comprising:

at least one processor constructed and configured for receiving at least two sets of images of the sporting implement;

the at least one processor identifying at least one motion region in the at least two sets of images;

the at least one processor identifying a first location of the sporting implement within the at least one motion region and a second location of the sporting implement based on the first location; and wherein the at least two sets of images comprise present, previous, and following images, and wherein image subtractions are performed to determine at least one first difference between the present video image and the previous video image, and at least one second difference between the present video image and the following video image, and wherein the at least one first difference and/or the at least one second difference is used to identify the at least one motion region.

2. The method of claim 1, wherein a probable location in 3D space for an identifiable portion of the sporting implement is identified for each of a plurality of instants comprising a timespan that the sporting implement was in motion.

3. The method of claim 2, wherein the probable location in 3D space for each of the plurality of instants is converted back into 2D space and superimposed on one or more images of the sporting implement.

4. The method of claim 2, wherein a 3D trajectory of the sporting implement is approximated based on the probable location in 3D space for each of the plurality of instants comprising the timespan that the sporting implement was in motion, and wherein extrapolation techniques are used to extrapolate a path and/or orientation of the sporting implement prior to and/or after the timespan.

5. The method of claim 1, wherein at least one candidate location for the sporting implement within the at least one motion region is identified, and wherein the at least one candidate location for the sporting implement is specified by pixel coordinates for each image in the at least two sets of images.

6. The method of claim 1, wherein at least one candidate location for the sporting implement within the at least one motion region is identified, wherein the at least one candidate location is filtered by one or more heuristics, and wherein the one or more heuristics includes enforcing a unidirectional path of motion.

7. The method of claim 1, further comprising the at least one processor identifying an approximate center of motion of the sporting implement and the at least one processor identifying the first location based on the approximate center of motion of the sporting implement.

8. A system for tracking a sporting implement during a sporting event, comprising:

at least one processor constructed and configured for receiving at least two sets of images of the sporting implement over a network;

wherein the at least one processor is operable to identify at least one motion region in the at least two sets of images;

wherein the at least one processor is further configured to approximate a trajectory of the sporting implement based on a location of the sporting implement;

wherein a probable location in 3D space for an identifiable portion of the sporting implement is identified for each of a plurality of instants comprising a timespan that the sporting implement was in motion; and wherein a 3D trajectory of the sporting implement is approximated based on the probable location in 3D space for each of the plurality of instants comprising the timespan that the sporting implement was in motion, and wherein extrapolation techniques are used to extrapolate a path and/or orientation of the sporting implement prior to and/or after the timespan.

9. The system of claim 8, wherein the at least one processor is operable to filter out at least one false positive probable location based on an expected unidirectional path of the sporting implement.

10. The system of claim 8, wherein the probable location in 3D space for each of the plurality of instants is converted back into 2D space and superimposed on one or more images of the sporting implement.

11. The system of claim 8, wherein the at least one processor is operable to generate an error score for the at least one probable location of the sporting implement, and wherein the at least one probable location is filtered out when the error score exceeds a location threshold score.

12. A system for tracking a sporting implement during a sporting event, comprising: at least one processor constructed and configured for network communication with at least two cameras configured to capture at least two sets of images of the sporting implement; and wherein the at least one processor is configured to receive the at least two sets of images of the sporting implement and approximate a trajectory of the sporting implement based on the at least two sets of images; and wherein the at least one processor is further configured to superimpose a representation of the trajectory of the sporting implement over at least one of the at least two sets of images.

13. The system of claim 12, wherein the at least one processor is further operable to approximate the trajectory of the sporting implement based on a comparison between a minimum distance threshold of the sporting implement and a maximum distance threshold of the sporting implement.

14. The system of claim 12, further comprising the at least one processor identifying an approximate center of motion of the sporting implement.

15. The system of claim 12, wherein the at least one processor is configured to approximate the trajectory of the sporting implement based on a physics model of the sporting implement in motion.

16. The system of claim 12, wherein the at least two cameras are configured using a set of physical markers placed at the sporting event.

17. The system of claim 12, wherein the trajectory of the sporting implement includes a multiplicity of trajectory pieces that collectively form the trajectory of the sporting implement.

* * * * *